United States Patent [19]
Buma et al.

[11] Patent Number: 4,714,272
[45] Date of Patent: Dec. 22, 1987

[54] SUSPENSION CONTROLLER

[75] Inventors: Shuuichi Buma, Toyota; Toshio Onuma, Susono; Kaoru Ohashi, Okazaki; Masami Itou, Toyota, all of Japan

[73] Assignee: Toyota Jidosha Kabushiki Kaisha, Toyota, Japan

[21] Appl. No.: 910,977

[22] Filed: Sep. 24, 1986

[30] Foreign Application Priority Data

Oct. 2, 1985 [JP] Japan ................ 60-221658

[51] Int. Cl.$^4$ .............................. B60G 11/26
[52] U.S. Cl. ................................... 280/707
[58] Field of Search .............. 280/6 H, 707, DIG. 1

[56] References Cited

U.S. PATENT DOCUMENTS

| | | | |
|---|---|---|---|
| 2,973,969 | 3/1961 | Thall | 280/707 |
| 3,632,131 | 1/1972 | Engfer | 280/707 |
| 4,350,354 | 9/1982 | Dotti et al. | 280/6 H |
| 4,600,215 | 7/1986 | Kuroki et al. | 280/707 |
| 4,634,143 | 1/1987 | Asami et al. | 280/6 H |

FOREIGN PATENT DOCUMENTS 5963218 9/1982 Japan ................ 280/707
60-183216 9/1985 Japan .

Primary Examiner—John J. Love
Assistant Examiner—Kenneth R. Rice
Attorney, Agent, or Firm—Oblon, Fisher, Spivak, McClelland, & Maier

[57] ABSTRACT

A suspension controller is provided to effectively absorb a sporadic shock by appropriately altering a suspension characteristic. Especially, when a sporadic shock is detected, which is caused by riding-through a dip or riding-over a bump of the front wheels, the suspension controller of the invention can alter the rear suspension characteristic before the rear wheels ride through the dip or over the bump. The suspension controller of the invention particularly includes restoration means for restoring the altered suspension characteristic when a predetermined delay time interval has elapsed from a time point at which a vehicle height data was determined to be out of a predetermined range by determination means, and for starting the recount of the predetermined delay time interval if the vehicle height data is again determined to be out of the predetermined range by the determination means before the predetermined delay time interval elapses from the first determination.

12 Claims, 31 Drawing Figures

SUSPENSION CONTROLLER

BACKGROUND OF THE INVENTION

1. Field of the Invention

This invention relates to a suspension controller for a vehicle, and more particularly to a suspension controller for effectively absorbing sporadic shocks to a vehicle body, caused by the wheels' riding-over a bump or riding-through a dip in a road surface.

2. Discussion of the Prior Art

In order to reduce shocks to a vehicle body depending upon the road condition and running condition of the vehicle, and furthermore to keep good control and high stability of the vehicle, various suspension controllers have been proposed. The suspension controller controls a suspension system, installed between a body and wheels, by altering the spring constant, damping force, bush characteristic, stabilizer characteristic or the like. For example, the following suspension controllers have been provided: one which controls a suspension system by altering the spring constant of the air spring of the suspension system in response to road condition (Japanese Published Unexamined Patent Application No. Sho-59-26638); one by altering both of the spring constant of the air spring and the damping force of the shock absorber (Japanese Published Unexamined Patent Application No. Sho-59-23712); one by altering only the damping force of the shock absorber (Japanese Published Unexamined Patent Application No. Sho-58-30542); one by altering the vehicle height (Japanese Published Unexamined Patent Application No. Sho-59-23713); one by altering the bush characteristic (Japanese Published Unexamined Utility Model Application No. Sho-59-132408); and one by altering the stabilizer characteristic (Japanese Published Unexamined Utility Model Applications Nos. Sho-59-129613 and Sho-59-135213).

When a vehicle height sensor detects that the vehicle is continuously running on a rough road or when a brake lamp switch or a throttle position sensor judges that a nose dive or a nose up is going to occur, the above-mentioned suspension controllers alter various characteristics of the suspension system so as to maintain good control and high stability in continuous rough road running or so as to prevent the subsequent nose dive or nose up.

SUMMARY OF THE INVENTION

The prior art suspension controllers described above, however, have various problems. Thus, objects of the invention are as follows.

The above suspension controllers determine that a vehicle is running on a rough road to alter the suspension characteristic, only when large changes of the vehicle height are continuously detected. Namely, when a sporadic shock occurs temporarily, e.g., when a vehicle moves on a road surface having a sporadic dip and bump or a joint of patches, the prior suspension controllers do not determine that the vehicle is running on a rough road, thus the suspension characteristic is not altered. The sporadic shock may cause a resonant vibration of unsprung mass or a vibration with a higher frequency, which further causes a large vertical acceleration. As a result, passengers in the vehicle experience an unpleasant feeling or sensation. Since the contact between the wheels and the road surface becomes intermittent by severe vertical vibrations of the wheels to weaken the grip of the tires, the performance of the vehicle such as turning, accelerating and braking is conspicuously deteriorated.

Accordingly, one object of the invention is to provide an improved suspension controller which effectively absorbs a sporadic shock and which dampens a consequent resonant vibration or a vibration near that in order to recover the grip of tires, thus allowing to improve the performance of the vehicle such as turning, accelerating and braking.

The prior art suspension controller does not alter the rear suspension characteristic before the rear wheels ride over a bump or through a dip which the front wheels have already ridden. Thus, the shock to the vehicle body, caused by riding-over the bump or riding-through the dip of the rear wheels, cannot be prevented.

Accordingly, another object of the invention is to provide a suspension controller which detects a sporadic shock, caused by riding-through a dip or riding-over a bump of the front wheels, as quickly as possible so as to alter the rear suspension characteristic before the rear wheels ride through the dip or over the bump.

If the suspension characteristic is, however, altered every time at which a displacement of the vehicle height is detected, its frequent alteration of the suspension characteristic causes a hunting. Thus, the durability of the suspension system is deteriorated.

Accordingly, still another object of the invention is to provide a further improved suspension controller which prevents the suspension characteristic from being altered unnecessarily so as to optimally control it.

A further object of the invention is to provide a suspension controller which alters the suspension characteristic in response to the road condition; i.e., in running on a rough road, the suspension characteristic is altered to improve the riding comfort, and in running on a flat road, such is altered to maintain good control and high stability.

In order to achieve these and other objects, a suspension controller for a vehicle according to this invention includes, as shown basically in FIG. 1, front vehicle height detection means M1 for detecting a vehicle height at a front wheel and for generating a vehicle height signal; determination means M2 for deriving a vehicle height data from the vehicle height signal, for determining if the vehicle height data is out of a predetermined range and for generating a determination signal according to the determined result; suspension characteristic alteration means M3 for altering a suspension characteristic of the vehicle before the rear wheels reach the position of a road, at which the front vehicle height data has been determined to be out of the predetermined range by the determination means M2, in response to the determination signal outputted from the determination means M2 for informing a driver that the front vehicle height data is out of the predetermined range; restoration means M4 for restoring the altered suspension characteristic when a predetermined delay time interval td has elapsed from a time point at which the vehicle height data was determined to be out of the predetermined range by the determination means M2, and for starting the recount of the predetermined delay time interval if the vehicle height data is again determined to be out of the predetermined range by the determination means M2 before the predetermined delay time interval elapses from the first determination.

The front vehicle height detection means M1, for example, detects a distance between a front wheel and the vehicle body as a vehicle height. For example, the detection means M1 may detect displacement of a suspension arm by a potentiometer to output it as an analog signal, or may detect the displacement as a revolutional angle of a grated disc to output it as a digital signal.

The determination means M2 derives vehicle height data from the vehicle height detected by the front vehicle height detection means M1, determines if the vehicle height data is out of a predetermined range, and outputs the determined result. Here, the vehicle height data is, for example, a displacement from a standard vehicle height, a speed or an acceleration of the height change or an amplitude of the vehicle height vibration. The displacement from the standard vehicle height can be derived as a difference between the current vehicle height and the predetermined standard vehicle height. The displacing speed of the vehicle height can be derived as a vehicle height change within a prescribed short time period. The displacing acceleration of the vehicle height can be derived as a change of the displacing speed within a prescribed short time period. The amplitude of the vehicle height vibration is a difference between the maximum value and the minimum value of the vehicle height detected within a prescribed time period. The determination means M2 compares the vehicle height data with a predetermined range of the vehicle height displacement. If the data is out of the range, the suspension characteristic is altered by the suspension characteristic alteration means M3. Here, the compared height data may be the derived data per se or it may be further converted nonlinearly to other data in order to exaggerate extra data.

The suspension characteristic alteration means M3 alters the suspension characteristic by altering, e.g., the spring constant of the suspension spring, the damping force of the shock absorber, the bush stiffness or the stabilizer stiffness discretely or continuously. For example, in an air suspension, the spring constant may be varied by connecting or disconnecting a main air chamber with/from an auxiliary air chamber. The damping force may be raised or lowered by altering the diameter of an orifice which controls oil flow in the shock absorber. The suspension characteristic is altered, for example, to "HARD" or to "SOFT" by varying the spring constant, damping force, the bush stiffness or the stabilizer stiffness.

The restoration means M4 restores the suspension characteristic which has been altered by the suspension characteristic alteration means M3, when a predetermined delay time interval td has elapsed from a time point at which the vehicle height data was determined to be out of a predetermined range by the determination means M2. On the other hand, it starts the recount of the delay time interval if the vehicle height data is again determined to be out of the predetermined range before the delay time interval td elapses. The determination means M2 and the restoration means M4 may be realized as logic circuits of discrete electronic elements, or may be realized as integrated logic circuits including a CPU (Central Processing Unit), a ROM (Read Only Memory), a RAM (Random Access Memory) and other peripheral circuitry chips so as to determine if a vehicle height data is a predetermined range and to execute the count of the delay time interval or to control the count in accordance with predetermined process steps.

Since the suspension controller according to the invention includes the restoration means M4 as described above, it can prevent the suspension characteristic from being altered unnecessarily. Namely, it can prevent the suspension characteristic from being altered each time the vehicle height data is determined to be out of a predetermined range by the determination means M2. As a result, the durability and the reliability of the suspension characteristic alteration means are remarkably improved.

BRIEF DESCRIPTION OF DRAWINGS

The invention may be best understood by reference to the following detailed description of preferred embodiments and the accompanying drawings, wherein like numerals denote like elements and in which:

FIGS. 13A through 18B show other examples of units for altering the suspension characteristic wherein;

FIG. 13A is a sectional view of a rubber bush as a first example;

FIG. 18B is an enlarged sectional view of the coupling unit of FIG. 18A.

DESCRIPTION OF THE PREFERRED EMBODIMENTS

Hereinafter, preferred embodiments will be described in detail according to the drawings.

Figure 1:
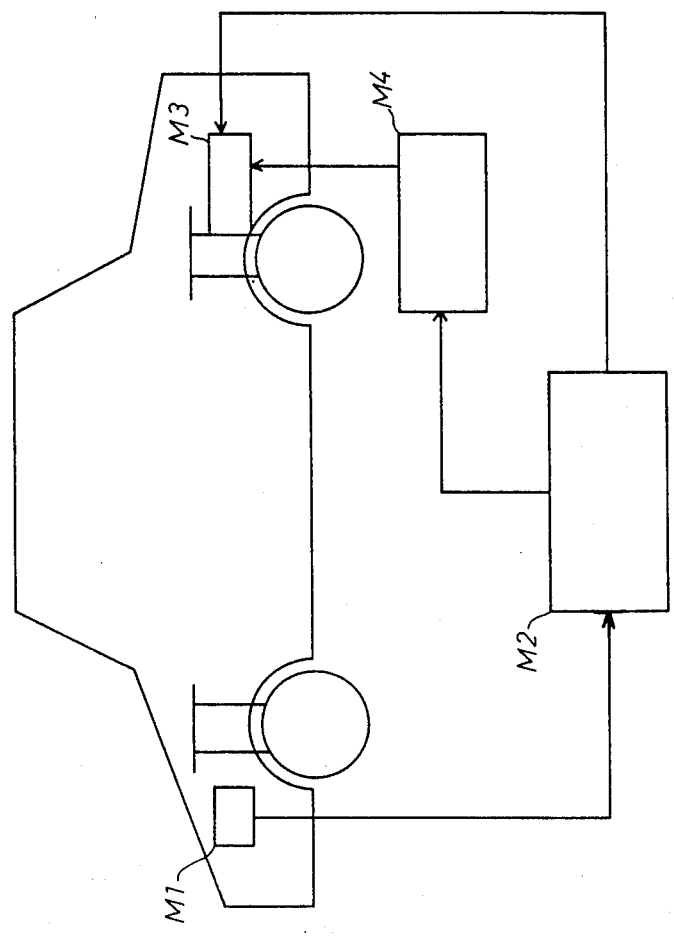
FIG. 1 is a schematic view of a basic structure embodying the present invention.
Figure 2:
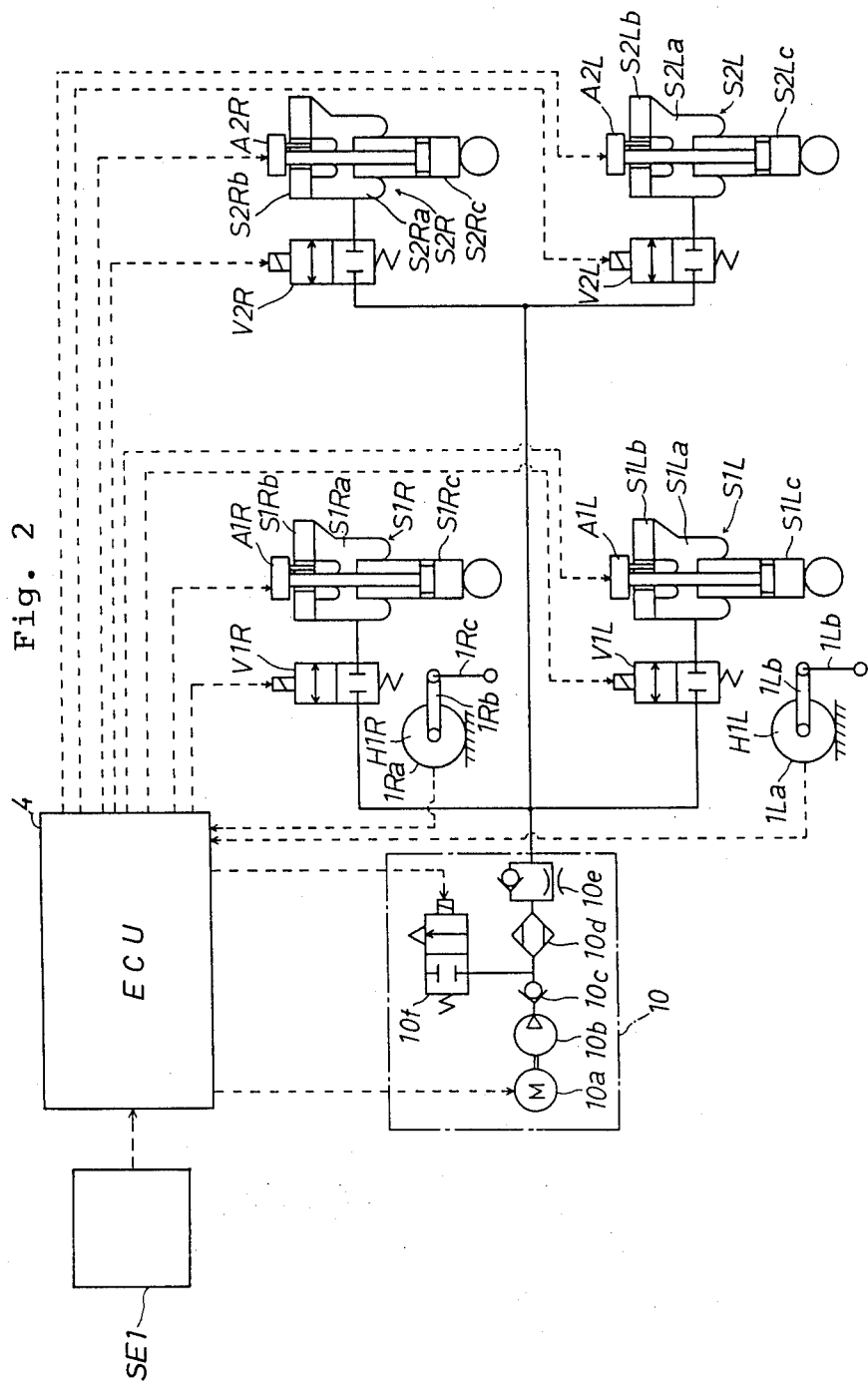
FIG. 2 is a systematic view illustrating a suspension controller of a preferred embodiment according to the invention.

FIG. 2 shows details of a suspension controller for a vehicle, having air suspensions, according to one embodiment of the invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. Short cylindrical bodies 1R$a$ and 1L$a$ of the vehicle height sensors H1R and H1L are secured on the vehicle body. Links 1R$b$ and 1L$b$ respectively extend substantially perpendicularly from each center shaft of the bodies 1R$a$ and 1L$a$. Turnbuckles 1R$c$ and 1L$c$ are rotatably coupled to each one end of the links 1R$b$ and 1L$b$ opposite the bodies 1R$a$ and 1L$a$ respectively. The other ends of the turnbuckles 1R$c$ and 1L$c$ opposite the links are rotatably coupled to parts of the suspension arms.

The vehicle height sensors H1R and H1L are provided with a plurality of light interrupters for detecting the vehicle height displacement as 4-bit data by operating a disc so as to switch on and off the light interrupters in response to changes in the vehicle height, thus outputting a digital signal. The disc is substantially provided coaxial with the center shaft of the vehicle height sensor and defines a slit thereon.

The following is an explanation of air suspensions S1R, S1R, S2R and S2L. The air suspension S2L is provided between the left rear suspension arm (not shown) and the vehicle body in parallel with a suspension spring (not shown). The air suspension S2L includes a main air chamber S2L$a$ functioning as an air spring, an auxiliary air chamber S2L$b$, a shock absorber S2L$c$, and an actuator A2L for altering the spring constant of the air spring and damping force of the shock absorber. Other air suspensions S1R, S1L and S2R have the same construction and function as the air suspension S2L, and are provided for the right front wheel, the left front wheel, and the right rear wheel, respectively.

A compressed air feed and discharge system 10 connected to each air spring of the air suspensions S1R, S1L, S2R and S2L operates a motor 10$a$ to drive a compressor 10$b$ for generating compressed air. The compressed air blows from the compressor 10$b$ to an air drier 10$d$ via a check valve 10$c$. The air drier 10$d$ dries the compressed air supplied for the air suspensions S1R, S1L, S2R and S2L, and protects every part of the air suspensions S1R, S1L, S2R and S2L from moisture. The air drier 10$d$ also prevents abnormal pressure changes which would accompany phase changes in main air chambers S1R$a$, S1L$a$, S2R$a$ and S2L$a$ and auxiliary air chambers S1R$b$, S1L$b$, S2R$b$ and S2L$b$ of the air suspensions. In a check valve 10$e$, the compressed air blows from the compressor 10$b$ side to each of the air suspensions S1R, S1L, S2R and S2L side. The check valve 10$e$ opens its checking portion in feeding the compressed air, and closes it in discharging the compressed air, thus discharging the compressed air only through the fixed portion thereof. A discharging valve 10$f$ is an electromagnetic valve of 2-port 2-position spring off-set type. The discharging valve 10$f$ is normally in the closed position as shown in FIG. 2. In discharging the compressed air from the air suspensions S1R, S1L, S2R and S2L, the valve 10$f$ is open to discharge the compressed air to the atmosphere via the check valve 10$e$ and the air drier 10$d$.

Air spring feed and discharge valves V1R, V1L, V2R and V2L function to adjust the vehicle height, and are provided between the air suspensions S1R, S1L, S2R and S2L, and the above-mentioned compressed air feed and discharge system 10, respectively. The air spring feed and discharge valves V1R, V1L, V2R and V2L are electromagnetic valves of 2-port 2-position spring off-set type. These valves are normally in the closed positions shown in FIG. 2, and are open in adjusting the vehicle height. When the air spring feed and discharge valves V1R, V1L, V2R and V2L are open, the main air chambers S1R$a$, S1L$a$, S2R$a$ and S2L$a$ are connected with the compressed air feed and discharge system 10. If the compressed air is fed from the system 10, the volumes in the main air chambers S1R$a$, S1L$a$, S2R$a$ and S2L$a$ are increased so as to raise the vehicle height, and if the air is discharged because of the vehicle weight itself, the volumes thereof are decreased so as to lower the vehicle height. On the other hand, if the feed and discharge valves V1R, V1L, V2R and V2L are closed, the vehicle height remains unchanged. As described above, it is possible to change the volumes of the main air chambers S1R$a$, S1L$a$, S2R$a$ and S2L$a$ of the air suspensions so as to adjust the vehicle height by operating the discharge valve 10$f$ and the air spring feed and discharge valves V1R, V1L, V2R and V2L.

A speed sensor SE1 is provided, for example, in a speedometer and outputs a pulse signal in response to the vehicle speed. The signals outputted from the vehicle height sensors H1R and H1L and the speed sensor SE1 are inputted to an Electronic Control Unit (ECU) 4. The ECU 4 derives data from the signals to process them and outputs a control signal to the actuators A1R, A1L, A2R and A2L of the air suspensions, to the air spring feed and discharge valves V1R, V1L, V2R and V2L, and to the motor 10$a$ and the discharging valve 10$f$ of the compressed air feed and discharge system 10 so as to optimally control them.

Figure 3:
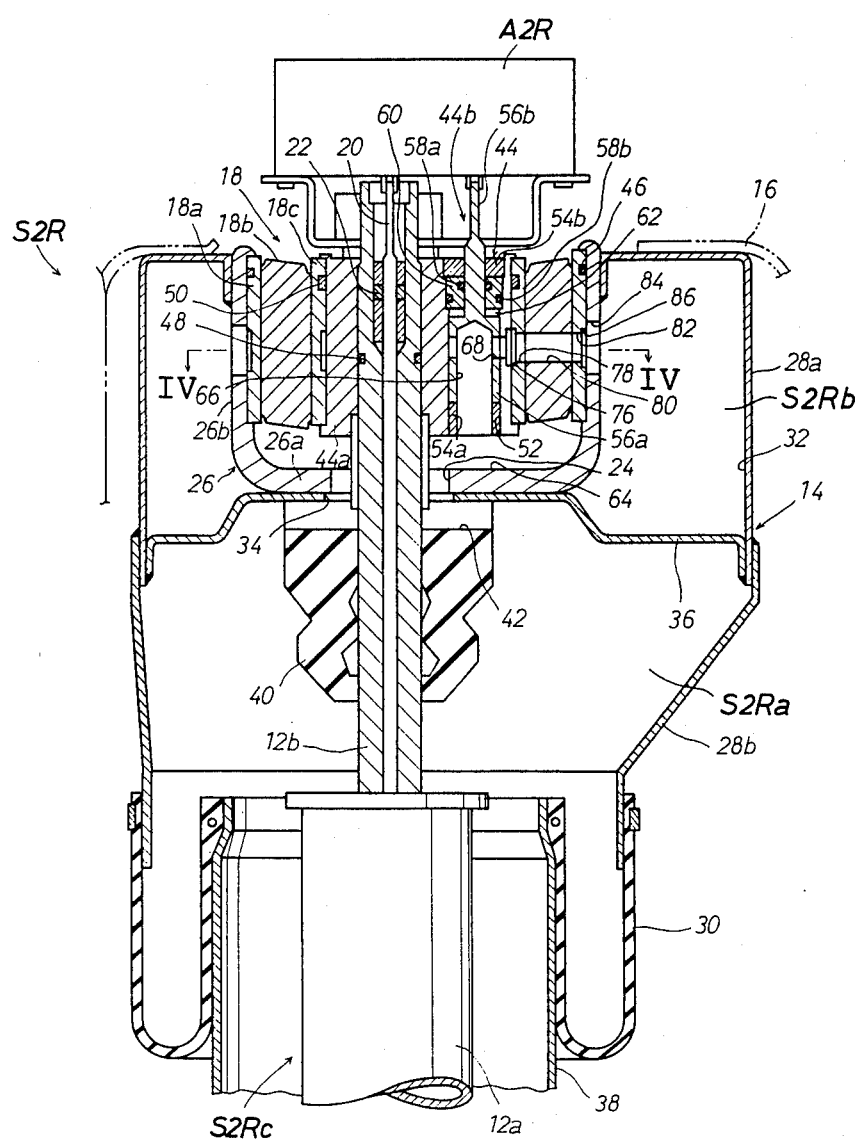
FIG. 3 is a sectional view showing main parts of the air suspension of FIG. 2.
Figure 4:
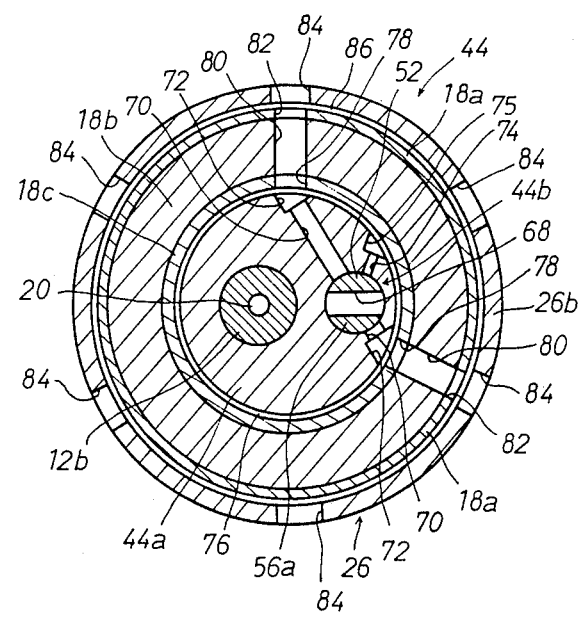
FIG. 4 is a cross sectional view of the air suspension, taken on line IV—IV of FIG. 3.

The following is an explanation of the main part of the air suspensions S1R, S1L, S2R and S2L based on FIGS. 3 and 4. Since each suspension has the same construction as the others, here, the right rear air suspension S2R is described.

The air suspension S2R includes a shock absorber S2R$c$ having a piston (not shown) and a cylinder 12$a$, and an air spring unit 14 provided in connection with a shock absorber S2Rc, as shown in FIG. 3.

An axle (not shown) is supported at the lower end of the cylinder 12a of the shock absorber S2Rc. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber S2Rc controls its damping force by operating on the valve function of the piston. A control rod 20 for controlling the damping force is liquid-tightly and rotatably fitted with a sealing member 22 in the piston rod 12b.

The air spring unit 14 has a chamber 32 which is defined by a circumferential member 26, an upper housing member 28a, a lower housing member 28b, and a diaphragm 30. The circumferential member 26 includes a bottom 26a having an opening 24, in which the piston rod 12b is inserted, and a wall 26b rising from the peripheral portion of the bottom 26a. The upper housing member 28a covers the circumferential member 26 and is secured on the vehicle body. The lower housing member 28b is open at the lower end and is coupled to the lower end of the upper housing member 28a. The diaphragm 30 includes an elastic material which closes the lower end of the lower housing member 28b. The chamber 32 is divided into a lower main air chamber S2Ra and an upper auxiliary air chamber S2Rb by a partition member 36, which is secured on the bottom 26a of the circumferential member 26 and which has an opening 34 corresponding to the opening 24 provided in the bottom 26a. Both the chambers S2Ra and S2Rb are filled with compressed air. The partition member 36 is provided with a buffer rubber 40 which can be brought into contact with the upper end of the cylinder 12a. The buffer rubber 40 has a passage 42 for connecting the openings 24 and 34 to the main air chamber S2Ra. The elastic cylindrical assembly 18 is disposed inside the circumferential member 26 whose wall 26b defines the inside circumferential surface of the auxiliary air chamber S2Rb, in such a manner that the assembly 18 surrounds the piston rod 12b.

The cylindrical elastic assembly 18 is provided with a valve unit 44 for controlling the connection of both the air chambers S2Ra and S2Rb. The assembly 18 includes an outer cylinder 18a, a cylindrical elastic member 18b and an inner cylinder 18c which are disposed concentrically to each other. The cylindrical elastic member 18b is secured to both the cylinders 18a and 18c. The outer cylinder 18a is press-fitted on the wall 26b of the circumferential member 26 secured on the vehicle body by means of the upper housing member 28a. A valve casing 44a of the valve unit 44, in which the piston rod 12b is inserted, is secured on the inner cylinder 18c. Since the piston rod 12b is secured on the valve casing 44a, the piston rod is elastically connected to the vehicle body by means of the cylindrical elastic assembly 18. An annular air sealing member 46 is tightly packed in-between the outer cylinder 18a and the wall 26b of the member 26. An annular air sealing member 48 is tightly packed in-between the piston rod 12b and the valve casing 44a. An annular air sealing member 50 is tightly packed in-between the inner cylinder 18c and the valve casing 44a.

The valve casing 44a has a hole 52 which is open at both its ends and which extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b is provided at the upper end of the hole 52 and cooperates with the lower positioning ring 54a to prevent the valve 44b from dropping out of the hole 52. An annular sealing base 60, holding an inner air sealing member 58a and an outer air sealing member 58b for tightly closing the hole 52, is provided between the upper positioning ring 54b and the main portion 56a of the valve 44b. A friction reducer 62 for smoothing the revolution of the valve 44b, when the main portion 56a of the valve is pushed to the sealing base 60 by air pressure, is provided between the sealing base 60 and the main portion 56a of the valve 44b.

A chamber 64 is formed in the lower portion of the elastic cylindrical assembly 18 and is connected with the main air chamber S2Ra by means of the openings 24 and 34 and the passage 42 of the buffer rubber 40. The main portion 56a of the valve 44b has a recess 66 open to the chamber 64, and has a connection passage 68 extending through the main portion 56a in a diametrical direction thereof across the recess 66.

The valve casing 56b, which houses the valve 56a, has a pair of air passages 70, each of which can connect at one end with the connection passage 68, as shown in FIG. 4. The air passages 70 extend outwards in a diametrical direction of the hole 52 toward the peripheral surface of the valve 44b. The other end of each air passage 70 is open to the peripheral surface of the valve casing 44a through a face hole 72. An air passage 74, which can connect at one end with the connection passage 68 of the hole 52, extends toward the peripheral surface of the valve casing 44a on the substantially same plane as the pair of air passages 70 and between them. The diameter of the air passage 74 is smaller than that of each of the air passages 70. The other end of the air passage 74 is open to the peripheral surface of the valve casing 44a through a face hole 75. The inside circumferential surface of the inner cylinder 18c, covering the peripheral surface of the valve casing 44a, has an annular recess 76 which surrounds the peripheral surface of the valve casing 44a in order to connect the face holes 72 and 75 of the air passages 70 and 74 to each other.

The inner cylinder 18c has openings 78 which are open to the recess 76 which constitutes an annular air passage. The cylindrical elastic member 18b has through holes 80, which extend outwards in the radial direction of the member 18b corresponding to the openings 78. The through holes 80 are open to the peripheral surface of the outer cylinder 18a through openings 82 of the cylinder so that the openings 78 and 82 and the through holes 80 define an air passage including the air passage 70 and extending through the elastic cylindrical assembly 18.

The peripheral surface of the wall 26b of the circumferential member 26 covering the outer cylinder 18a is provided with a plurality of openings 84, which are located at equal intervals in the circumferential direction of the member 26 and which are open to the auxiliary air chamber S2Rb so as to connect the openings 78 and 82 and the through holes 80 with the auxiliary air chamber S2Rb. The peripheral surface of the outer cylinder 18a is provided with an annular recess 86, which surrounds the outer cylinder 18a at the openings 82, so as to connect the openings 84, 78 and 82 and the through holes 80 to each other. The openings 84 are open to the recess 86 constituting an annular air passage.

In the embodiment shown in FIG. 4, the positions of the openings 78 and 82 and the through holes 80 are defined by the positions of the two air passages 70 of the valve casing 44a. The air passages 70 and 74 can be optionally provided in positions to the circumferential direction of the elastic member 18b sincse the annular recess 76, with which the air passages 70 and 74 are connected, is formed between the inner cylinder 18c and the valve casing 44a.

The control rod 20 for controlling the damping force of the shock absorber S2Rc, and the actuator A2R for rotating the rotary valve 44b of the valve unit 44, are provided at the upper end of the piston rod 12b, as shown in FIG. 3.

Since the air suspension S2R has the above-mentioned construction, the air suspension functions as described hereinafter.

When the valve 44b is kept in a closed position as shown in FIG. 4 so that the connection passage 68 of the valve disconnects from any of the air passages 70 and 74 of the valve casing 44a, the main air chamber S2Ra and the auxiliary air chamber S2Rb are disconnected from each other, thus the spring constant of the suspension S2R is set at a large value.

When the actuator A2R rotates the valve 44b into such a position that the connection passage 68 of the valve connects with the large-diameter air passages 70 of the valve casing 44a, the main air chamber S2Ra is connected with the auxiliary air chamber S2Rb through the connection passage 68, the large-diameter air passages 70, the openings 78 and 82 and the through holes 80 of the elastic assembly 18 and the openings 84, thus the spring constant of the suspension S2R is set at a small value.

When the valve 44b is rotated into such a position by the actuator A2R that the connection passage 68 of the valve connects with the small-diameter air passage 74 of the valve casing 44a, the main air chamber S2Ra is connected with the auxiliary air chamber S2Rb through the connection passage 68, the small-diameter air passage 74, the annular recess 76, the opening 78 and 82 and the through holes 80 of the elastic assembly 18 and the openings 84, thus the spring constant of the suspension S2R is set at an intermediate value. This is because the small-diameter air passage 74 provides a higher air flow resistance than the large-diameter air passages 70.

Figure 5:
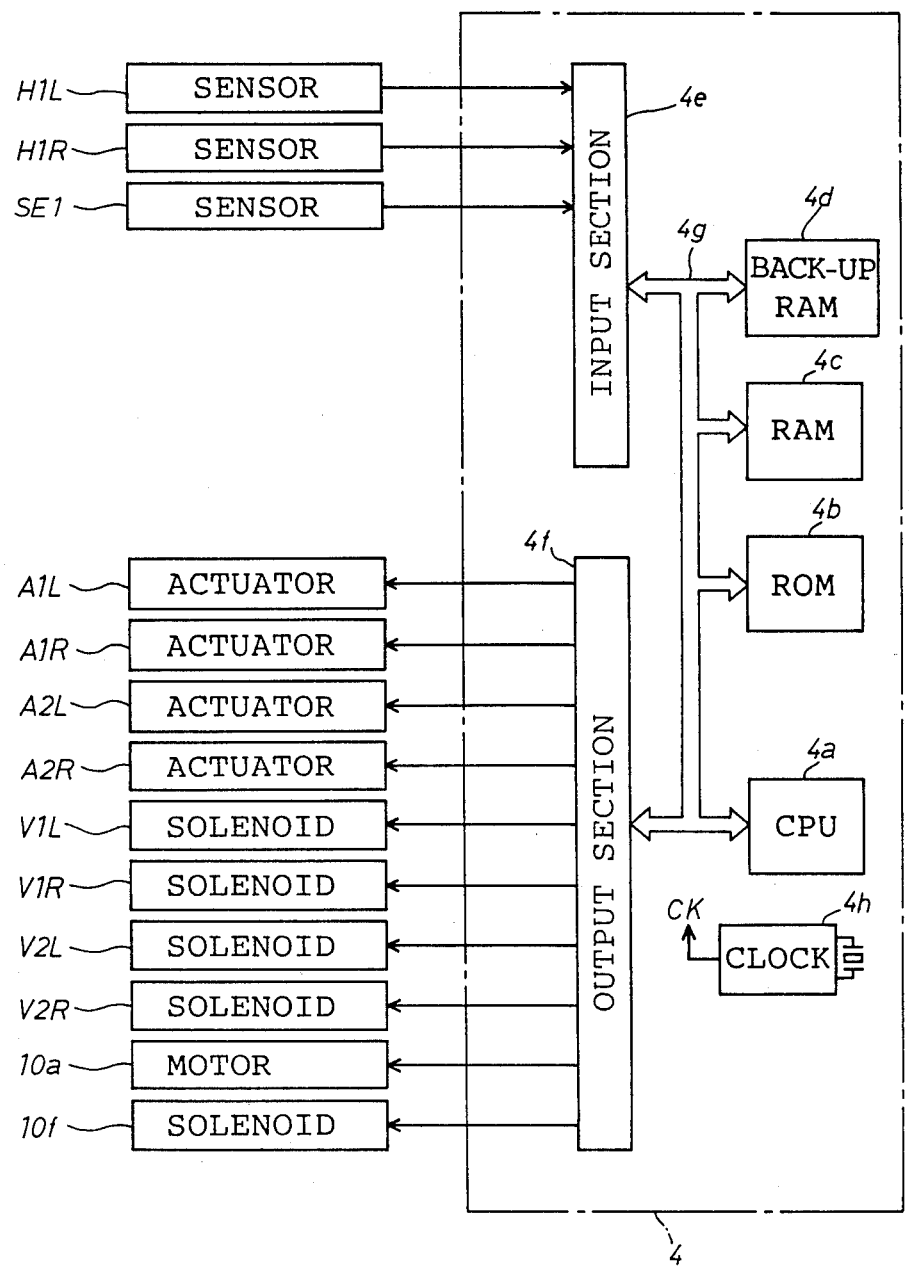
FIG. 5 is a block diagram illustrating a construction of the Electronic Control Unit (ECU) of FIG. 2.

FIG. 5 shows the construction of the ECU 4. The ECU 4 includes a Central Processing Unit (CPU) 4a, a Read Only Memory (ROM) 4b, a Random Access Memory (RAM) 4c, a back-up Random Access Memory (back-up RAM) 4d, an input section 4e, an output section 4f, a bus line 4g and a clock circuit 4h. The CPU 4a receives output data from the sensors to process them according to a control program for controlling various apparatuses, means or the like. In the ROM 4b, the control program and initial data are stored. The RAM 4c functions to write and read out data, which the ECU 4 receives for the control. The backup RAM 4d is backed up by a battery so as to retain data even if the ignition key switch of the automobile is turned off. The input section 4e includes an input port (not shown), a waveshaping circuit (as occasion demands), a multiplexer which selectively sends out output signals from the sensors to the CPU 4a, and an A/D converter which converts an analog signal into a digital signal. The output section 4f includes an output port (not shown), and a drive circuit for driving the actuators according to the control signal of the CPU 4a as occasion demands. The bus line 4g connects the element, such as the CPU 4a, the ROM 4b, and the input and the output sections 4e and 4f, with each other so as to transmit data from each element. The clock circuit 4h sends out a clock signal for informing the control timing at predetermined time intervals to the CPU 4a, the ROM 4b, the RAM 4c, etc.

Figure 6:
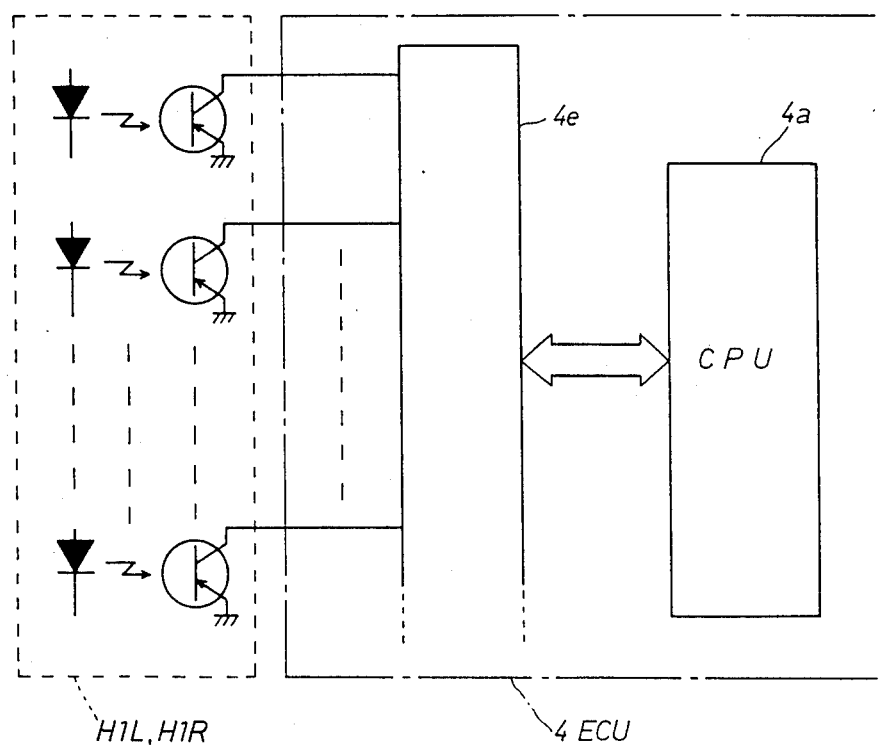
FIG. 6 is a block diagram illustrating an example of a digital type of the vehicle height sensor and the signal input circuit of FIG. 2.
Figure 7:
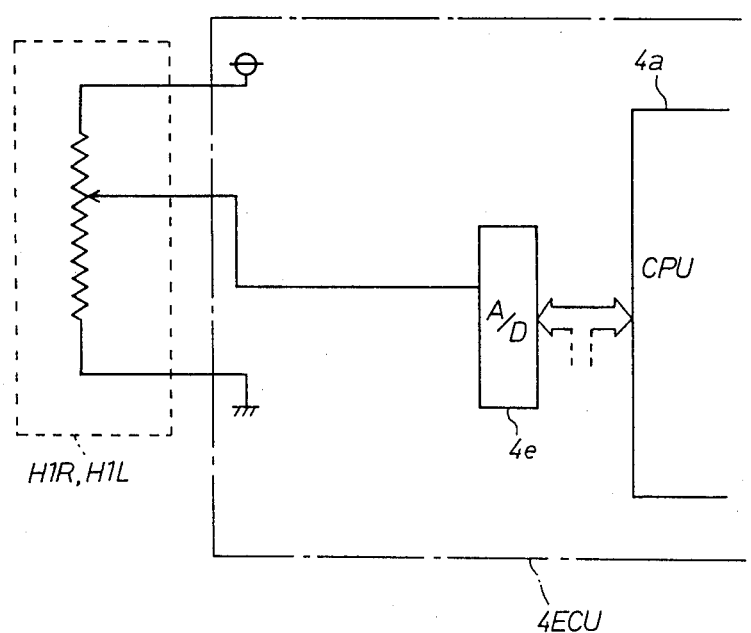
FIG. 7 is a block diagram illustrating an example of an analog type vehicle height sensor and the signal input circuit of FIG. 2.

If the signals outputted from the vehicle height sensors H1R and H1L are 4-bit digital signals, they are transmitted to the CPU 4a via the input section 4e as shown in FIG. 6. On the contrary, if being analog signals, they are converted into digital ones and are then transmitted to the CPU 4a as shown in FIG. 7.

Figure 8:
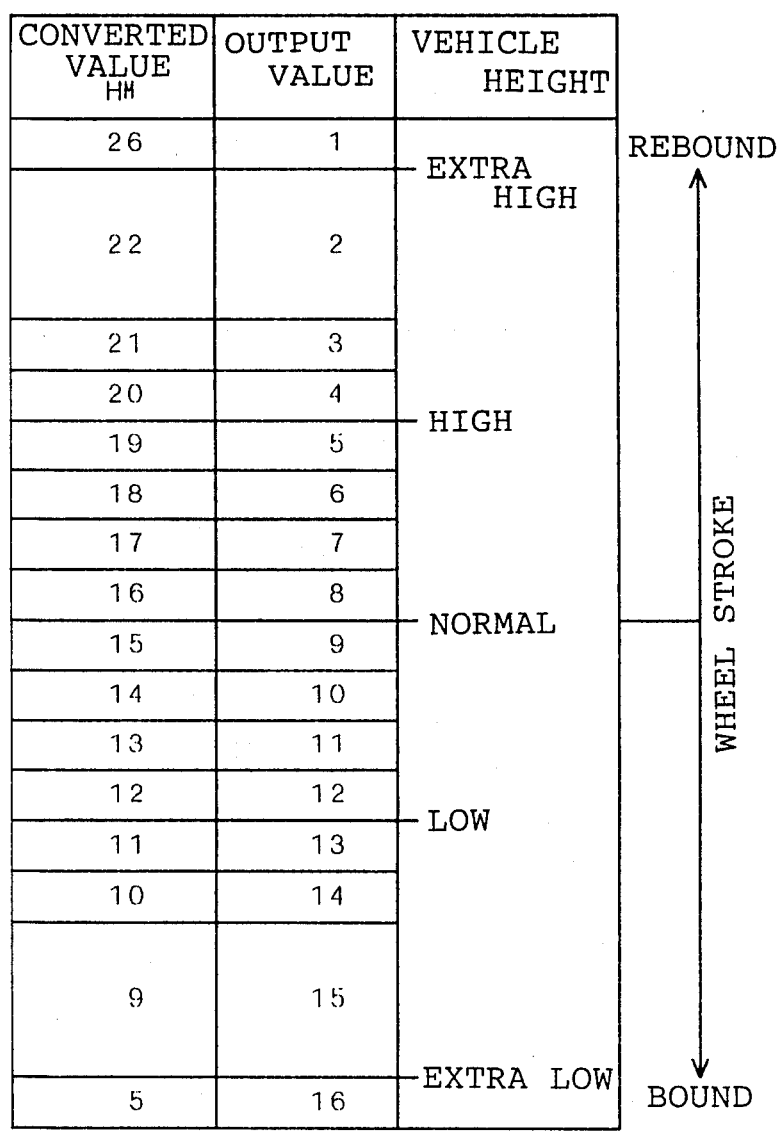
FIG. 8 is a table which defines the relationship between the vehicle height sensor output value and the vehicle height converted value in the embodiment.

A converted vehicle height HM used in the embodiment is now described based on FIG. 8. The front vehicle height sensors H1L and H1R respectively detect the distance between the front wheel and the vehicle body, and output one from among sixteen digital values (1 through 16), represented by 4-bit data, corresponding to the current vehicle height. If wheels are bounded by the riding-over of a bump, a value corresponding to the low position or the extra low position of the vehicle height is outputted. On the contrary, if the wheels are rebounded by the riding-through of a dip, a value corresponding to the high position or the extra high position of the vehicle height is outputted. The relationship between the output value of the vehicle height sensor and the converted vehicle height is defined as shown in the table of FIG. 8. The ECU 4 converts the output values from the front vehicle height sensors H1L and H1R to the converted values HM based on the table previously stored in the ROM 4b. The subsequent judgment on the vehicle height displacement is performed based on the converted vehicle height HM. In the table, the converted values HM of the vehicle height near the extra high position or the extra low position are defined in unequal intervals so as to prevent bottoming or the like.

Figure 9:
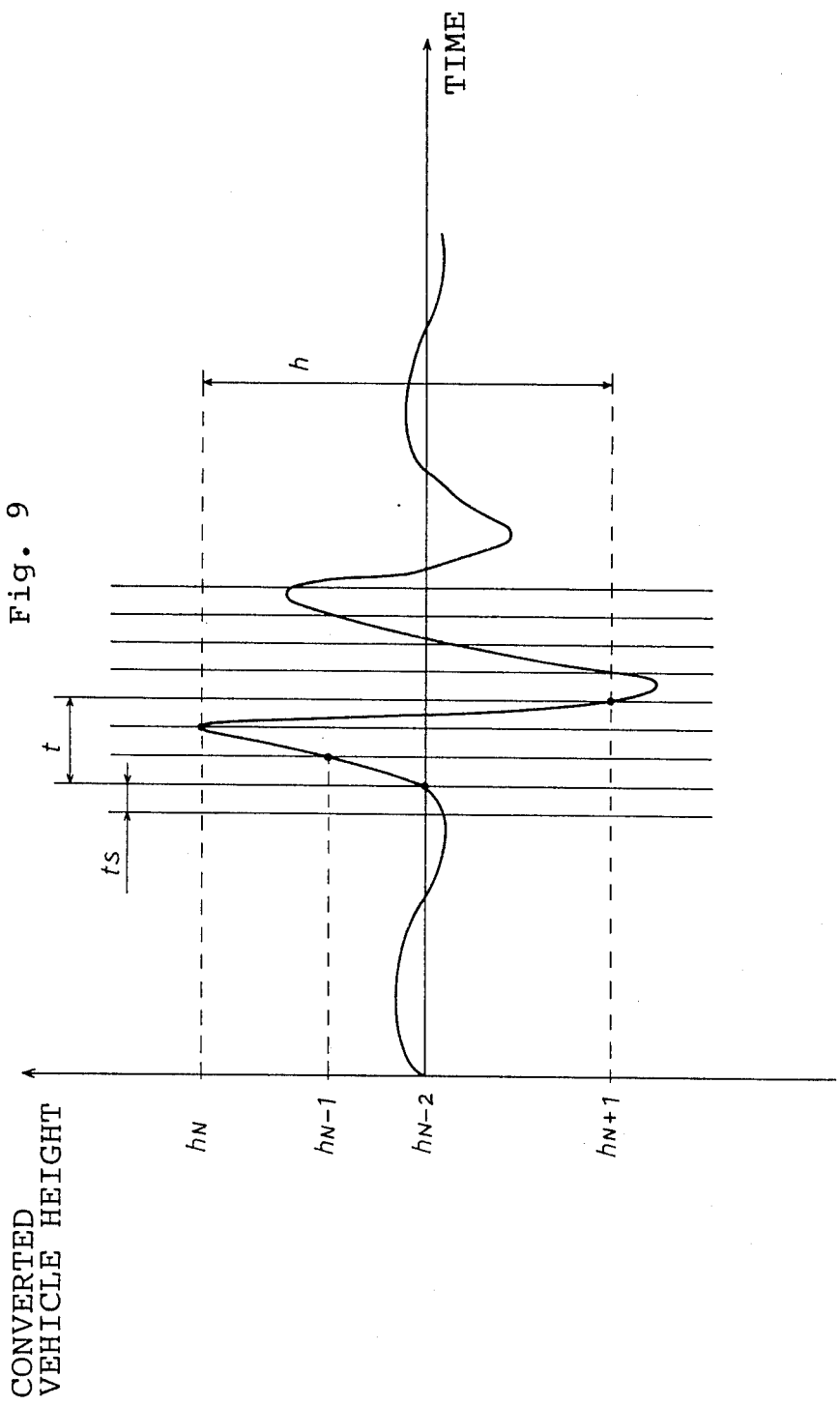
FIG. 9 illustrates the relationship between the vehicle height displacement and the detection time in the embodiment.

The relationship between the converted vehicle height and the detection time is explained based on FIG. 9. In the figure, ts is a time interval for detecting the vehicle height at the front vehicle height sensors H1L and H1R (8 msec. in this embodiment), and t is a time interval for defining a (converted) vehicle height displacement from the vehicle height values which are detected at every time interval ts. The time interval t is defined as follows. PS $$t = (n-1) \times ts \tag{1}$$

n: the number of the detected vehicle height values
In this embodiment, n is equal to 4, and t is set to a time period shorter than or equal to a cycle time of the resonant vibration of unsprung mass. The time interval t also satisfies the inequality (2).

$$t \leq Tr - Ta \tag{2}$$

Tr: a time difference between the front wheels and the rear wheels
Ta: a time period for altering the suspension characteristic The time difference Tr is calculated as follows.

$$Tr = WB/V \tag{3}$$

WB; wheelbase

V; vehicle speed

In this embodiment, the converted value h of the maximum displacement of the vehicle height is computed from the difference between the maximum converted vehicle height hN and the minimum converted vehicle height hN+1 for the time interval t. If the converted value h is greater than or equal to a predetermined reference value hK, the suspension characteristic is altered from "SPORT" to "SOFT", and after a delay time interval td has elapsed, the suspension characteristic is restored from "SOFT" to "SPORT".

Figure 10A:
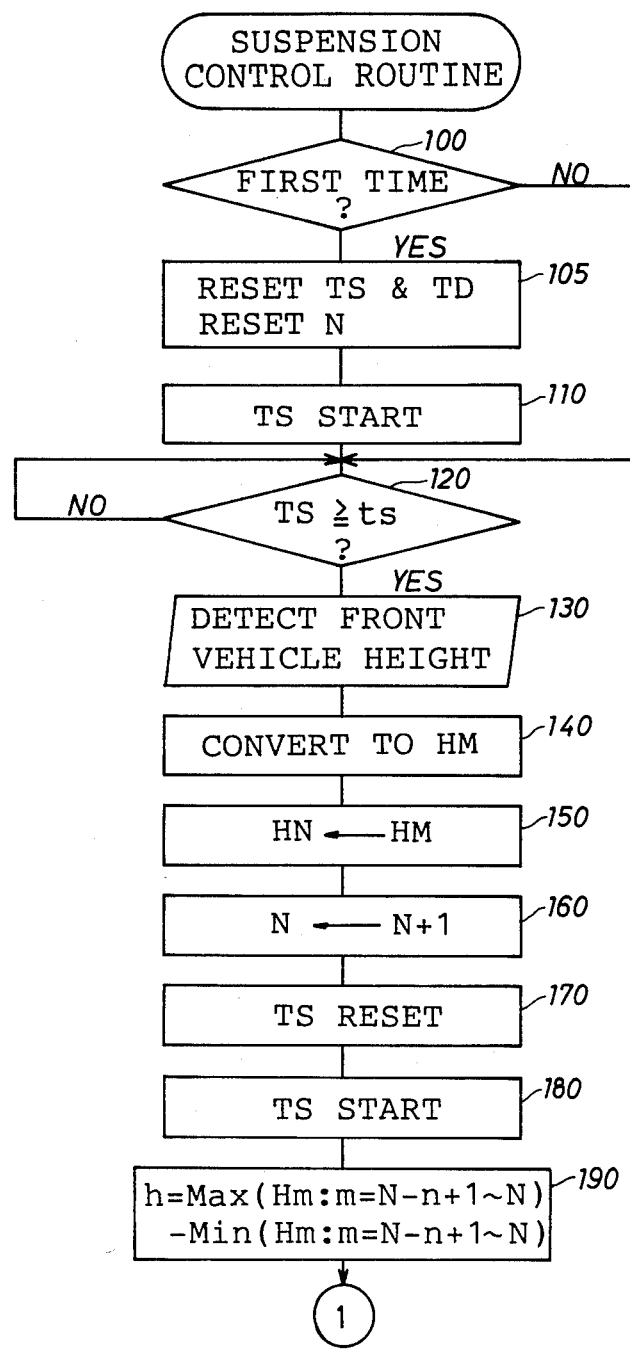
FIGS. 10A and 10B are flow charts showing the processing steps executed by the ECU of FIG. 5 in the embodiment.
Figure 10B:
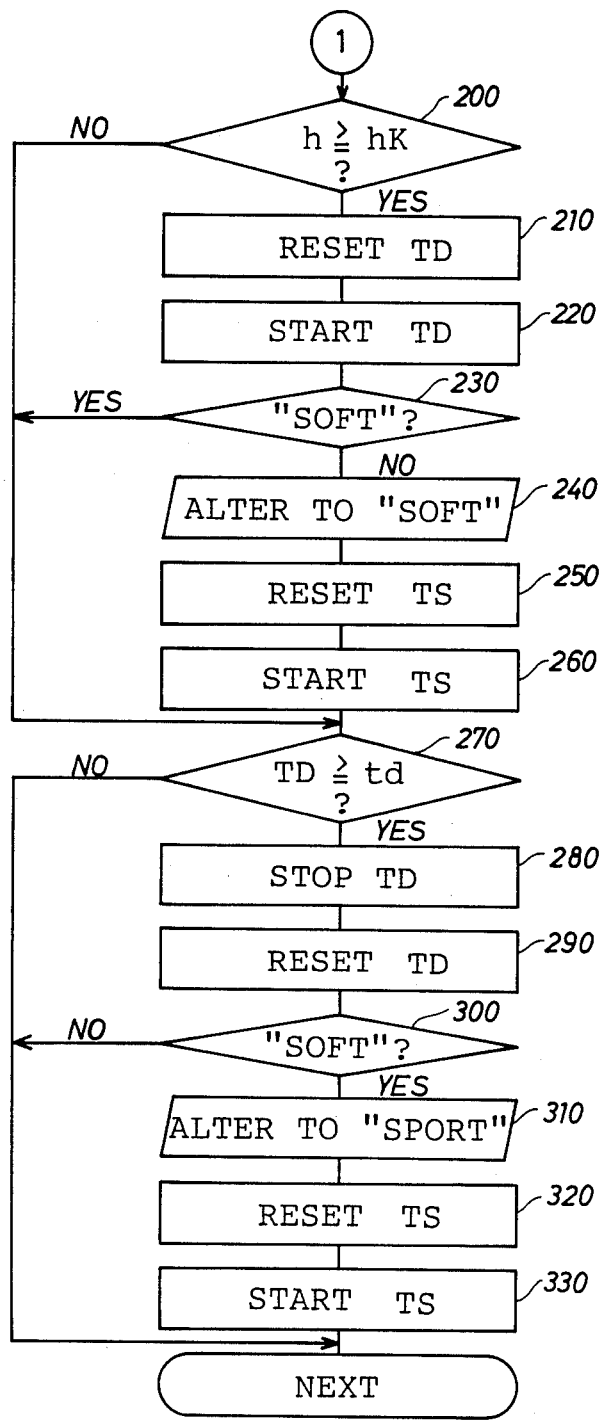

The suspension control process steps executed by the above-mentioned ECU 4 is explained based on flow charts of FIGS. 10A and 10B. The program enters the suspension control routine when the vehicle is in the cruising state, i.e., when the vehicle speed V reaches in the range of 30 to 80 (Km/h) after start and acceleration, and when the "AUTO" mode is selected by a driver. This routine is repeatedly executed at every predetermined time interval. The outline of the routine is first explained.

(1) The front vehicle height is detected at every time interval ts. (steps 120, 130, 140, 150, 160, 170 and 180)

(2) The converted value h of the maximum vehicle height displacement of the time interval t is computed. (step 190)

(3) The converted value h of the maximum displacement computed in process (2) is compared with the reference value hK. (step 200)

(4) If h is greater than or equal to hK, the suspension characteristic is altered to "SOFT", and after the delay time interval td has elapsed, the suspension characteristic is restored to "SPORT". (steps 210, 220, 240, 270, 280, 290 and 310)

(5) If it is again determined that h is greater than or equal to hK before the delay time interval td elapses, the recount of the delay time interval td is started at that time. (steps 200, 210 and 220)

The details of the suspension control routine are explained hereinafter. At the decision point 100 of FIG. 10A, it is determined if this process step is executed for the first time after starting the ECU 4. If it is determined to be the first time, the program proceeds to step 105 where the initialization is executed, and if not, the program proceeds to step 120.

At step 105, a timer TS for counting a time interval ts for detecting the vehicle height, another timer TD for counting a delay time interval td, and a data counter N are reset. The timer TS is started to count at step 110. The program then proceeds to the decision point 120 at which the counted value in the timer TS is compared with the time interval ts. If TS is less than ts, step 120 is repeatedly executed. On the other hand, if TS is determined to be greater than or equal to ts, the program proceeds to step 130 where the vehicle height is detected by the front vehicle height sensors H1L and H1R. The vehicle height may be either of the right front vehicle height or the left front vehicle height or may be the mean value of both the heights. At step 140, the vehicle height, detected at step 130, is converted to the converted vehicle height HM. The program then proceeds to step 150 where the converted value HM is stored as the $N^{th}$ vehicle height data HN. At step 160, the value in the data counter N is incremented by one. At step 170, the timer TS is reset. The program then proceeds to step 180 where the timer TS is started to recount. The above steps 170 and 180 are executed every time when the vehicle height is detected at step 130. At step 190, the converted value h of the maximum vehicle height displacement for the time interval t is computed as follows.

$$h = \text{Max}(Hm: m=N-n+1 \text{ to } N) - \text{Min}(Hm: m=N-n+1 \text{ to } N) \tag{4}$$

Max(Am:m=1 to M): a function indicative of the maximum value among A1 through AM
Min(Am:m=1 to M): a function indicative of the minimum value among A1 through AM
N: value in the data counter
n: the number of detected values (4 in this embodiment)

Namely, at step 190, computed is the difference between the maximum and the minimum values among the converted values (four values in this embodiment) of the vehicle height, which are successively detected. The program then proceeds to the decision point 200 of FIG. 10B at which the converted value h of the maximum vehicle height displacement, computed at step 190, is compared with the reference value hK in order to judge if the vehicle moves on a flat road. If the converted value h is less than the reference value hK, the ECU determines that the road surface is substantially flat and the program cycle proceeds to the decision point 270 at which the counted value in the timer TD is compared with the delay time interval td. In this case, however, since the count of time by the timer TD has not been initiated yet, TD is determined to be less than td at step 270 and the program cycle exits from this routine.

On the other hand, if the converted value h is greater than or equal to the reference value hK, the ECU determines that the road surface has a large bump or dip and the program cycle proceeds to step 210 where the timer TD is reset. At the following step 220, the timer TD is initiated to count. The program then proceeds to the decision point 230 at which it is determined by a flag (not shown) if the suspension characteristic is in "SOFT". If the suspension characteristic has already altered to "SOFT", the program cycle proceeds to the decision point 270, and if the suspension characteristic is in "HARD" or "SPORT", proceeds to step 240. At step 240, the suspension characteristic is altered to "SOFT". For example, it may be accomplished by making the main air chambers S1Ra, S1La, S2Ra and S2La of the air suspensions S1R, S1L, S2R and S2L connect with the auxiliary air chambers S1Rb, S1Lb, S2Rb and S2Lb thereof by activating the actuators A1R, A1L, A2R, and A2L so as to lower the spring constants of the air springs of the air suspensions. It may be also accomplished by reducing the damping force of the shock absorbers S1Rc, S1Lc, S2Rc and S2Lc by reversing the control rods 20 thereof. The program then proceeds to step 250 where the timer TS is reset. At step 260, the timer TS is started to recount. The above steps 250 and 260 are executed every time when the suspension characteristic is altered to "SOFT" at step 240.

The program cycle proceeds to the decision point 270 at which the counted value in the timer TD, which is initiated at step 220, is compared with the delay time interval td. Here, td is a time interval for restoring the suspension characteristic, and is normally longer than a time period calculated by dividing the wheel base by the current vehicle speed, i.e., WB/V, and is preferably shorter than the three times of the above time period. At the decision point 270, if TD is determined to be less than td, the program cycle exits from this routine. On the other hand, if TD is greater than or equal to td, i.e., if the delay time interval td has elapsed while the above steps 120 thru 200 are repeatedly executed, the program cycle proceeds to step 280 where the timer stops counting. At step 290, the timer TD is reset.

The program cycle then proceeds to the decision point 300 at which it is determined by a flag (not shown) if the suspension characteristic is in the "SOFT" state. If the suspension characteristic has been already altered to "SPORT" or "HARD", the program cycle exits from this routine. On the contrary, if the suspension characteristic is still in the "SOFT" state, the program cycle proceeds to step 310 where the suspension characteristic is altered to "SPORT". Namely, the spring constants and damping force of the air suspensions S1R, S1L, S2R and S2L are set to the intermediate values by activating the actuators A1R, A1L, A2R and A2L. At step 320, the timer TS is reset. At the following step 330, the timer TS is started to recount. The above steps 320 and 330 are executed every time when the suspension characteristic is altered at step 310. The program cycle then exits from this suspension control routine. This routine is thus repeatedly executed at every predetermined time interval.

In short, the suspension control routine is executed as follows.

(A) The front vehicle height is detected at every time interval ts and is converted to the converted vehicle height HM. (steps 120, 130, 140, 150 and 160)

(B) The converted value h of the maximum vehicle height displacement is computed at every time interval t and is compared with the reference value hK. (steps 190 and 200)

(C) If the converted value h is greater than or equal to the reference value hK, the timer TD for counting the delay time interval is initiated to count and the suspension characteristic is altered to "SOFT". (steps 210, 220 and 240)

(D) If the converted value h becomes less than the reference value hK while the above process steps (A) and (B) are repeatedly executed until the delay time interval td has elapsed, the suspension characteristic is restored to "SPORT". (steps 120, 130, 140, 150, 160, 170, 180, 190, 200, 270, 280, 290 and 310)

(E) On the contrary, if the converted value h is again determined to be greater than or equal to the reference value hK before the delay time interval td elapses, the timer TD is started to recount and the suspension characteristic is retained in "SOFT" state. (steps 120, 130, 140, 150, 160, 170, 180, 190, 200, 210, 220 and 270)

When the program cycle proceeds through the steps of this suspension control routine without the alteration of the suspension characteristic (steps 100, 120, 130, 140, 150, 160, 170, 180, 190, 200, and 270), the processing time is shorter than the time interval ts for detecting the vehicle height.

Figure 11:
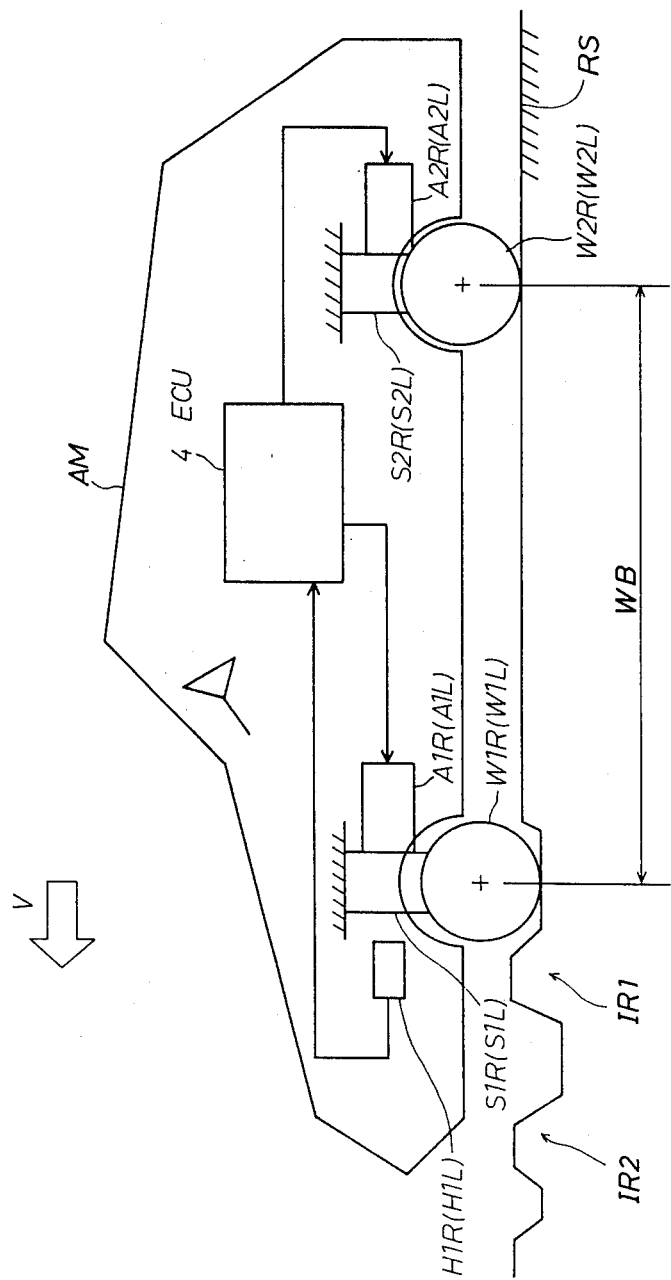
FIG. 11 is a schematic view illustrating the manner in which an automobile with the suspension controller of the embodiment moves on a road surface having dips and bumps.
Figure 12:
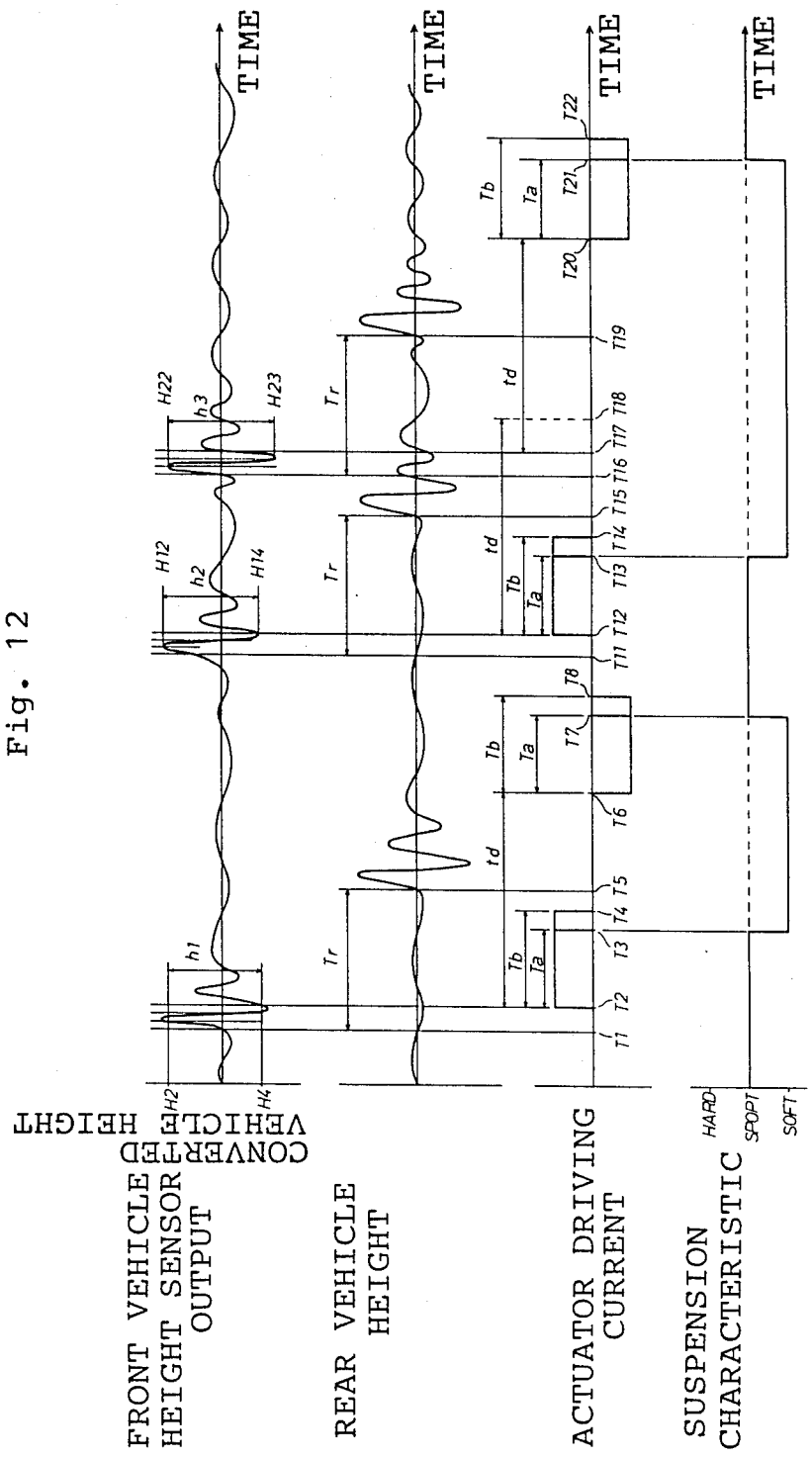
FIG. 12 set forth timing charts respectively showing the front vehicle height sensor output, the rear vehicle height, the suspension characteristic alteration actuator driving current and the suspension characteristic in the automobile of FIG. 11 against the elapsed time.

One example of the control timing of this suspension control routine is described in accordance with FIGS. 11 and 12. FIG. 11 illustrates that a front wheel W1R (or W1L) of an automobile AM is passing through an irregularity IR1 of a road surface RS when running at a speed V (m/sec.). FIG. 12 shows the output of the front vehicle height sensor H1R (or H1L), the vehicle height displacement of the rear wheel W2R (or W2L), driving current for the suspension characteristic alteration actuators (A1R, A1L, A2R and A2L) and the change of the suspension characteristic against the elapsed time under the condition of FIG. 11.

In FIG. 12, T1 is a time point at which the front wheel W1R (or W1L) starts to pass through the irregularity IR1 after running on the flat part of the road surface RS. After the time point T1, the converted vehicle height HM, computed based on the vehicle height detected from the front vehicle height sensor H1R (or H1L), is largely fluctuated. The vehicle height is detected at every time interval ts from the time point T1. At a time point T2 after the time interval t has elapsed from the time point T1, the converted value h1 (6 in this embodiment) of the maximum vehicle height displacement is compared with the reference value hK (5 in this embodiment) by the ECU 4. The converted value h1 is a difference between the maximum converted vehicle height H2 (19 in this embodiment) and the minimum converted vehicle height H4 (13 in this embodiment). Since H1 (6) is greater than hK (5), at the time point T2, the ECU 4 outputs a control signal to the suspension characteristic alteration actuators A1R, A1L, A2R and A2L for altering the suspension characteristic to "SOFT". As a result, the actuators A1R, A1L, A2R and A2L are activated to connect the main air chambers S1R$a$, S1L$a$, S2R$a$ and S2L$a$ of the air suspensions S1R, S1L, S2R and S2L with the auxiliary air chambers S1R$b$, S1L$b$, S2R$b$ and S2L$b$ thereof by means of large diametrical passages so as to lower the spring constants of the air springs, thus altering the suspension characteristic to "SOFT". The alteration of the suspension characteristic is accomplished at a time point T3 after the time period Ta, required for altering the suspension characteristic, has elapsed from the time point T2. The current for driving the actuators A1R, A1L, A2R and A2L is supplied until a time point T4 after a time period Tb has elapsed from the time point T2. Tb is a time period for driving the actuators for the alteration of the suspension characteristic.

At a time point T5 after the time difference Tr between the front wheels and the rear wheels has elapsed from the time point T1, at which the front wheel W1R (or W1L) started to pass through the irregularity IR1, the rear wheel W2R (or W2L) starts to pass through the irregularity IR1. Since the suspension characteristic has been already altered to "SOFT" before the time point T5, the influence of shocks to the rear wheel W2R (or W2L) upon the vehicle body is reduced.

At a time point T6 after the delay time interval td for restoring the suspension characteristic has elapsed from the time point T2, at which the suspension characteristic was altered, the rear wheel W2R (or W2L) has also passed through the irregularity IR1 and again runs on the flat part of the road surface RS. For a time period between the time point T2 and the time point T6, the outputs of the front vehicle height sensor H1R (or H1L) are scarcely fluctuated. Thus, at the time point T6, the ECU 4 outputs a control signal to the suspension characteristic alteration actuators A1R, A1L, A2R and A2L so as to alter the suspension characteristic to "SPORT" for cruising. As a result, the actuators A1R, A1L, A2R and A2L are activated to connect the main air chambers S1R$a$, S1L$a$, S2R$a$ and S2L$a$ of the air suspensions S1R, S1L, S2R and S2L with the auxiliary air chambers S1R$b$, S1L$b$, S2R$b$ and S2L$b$ thereof by means of small diametrical passages so as to restore the spring constants of the air springs, thus altering the suspension characteristic to "SPORT". The alteration of the suspension characteristic is accomplished at a time point T7 after the time period Ta has elapsed from the time point T6. The current for driving the actuators A1R, A1L, A2R and A2L is supplied until a time point T8 after the time period Tb has elapsed from the time point T6.

At a time point T12 after the time interval t has elapsed from a time point T11, the converted value h2, which is a difference between the maximum converted vehicle height H12 and the minimum converted vehicle height H14, is compared with the reference value hK by the ECU 4. Since h2 is greater than hK at the time point T12, the ECU 4 starts to alter the suspension characteristic from "SPORT" to "SOFT". The alteration of the suspension characteristic is accomplished at a time point T13 after the time period Ta has elapsed from the time point T12. The current for driving the actuators A1R, A1L, A2R and A2L is supplied until a time point T14 after the time period Tb has elapsed from the time point T12.

At a time point T15 after the time difference Tr has elapsed from the time point T11, at which the front wheel W1R (or W1L) started to pass through the irregularity IR1, the rear wheel W2R (or W2L) starts to pass through the above irregularity IR1. At a time point T16 after the delay time interval td has elapsed from the time point T12, at which the suspension characteristic was altered, the front wheel W1R (or W1L) starts to pass through another irregularity IR2. At a time point T17 after the time interval t has elapsed from the time point T16, the converted value h3, which is a difference between the maximum converted vehicle height H22 and the minimum converted vehicle height H23, is compared with the reference value hK by the ECU 4. Since h3 is greater than hK at the time point T17, the ECU 4 starts to count the delay time interval td.

At a time point T19 after the time difference Tr has elapsed from the time point T16, at which the front wheel W1R (or W1L) started to pass through the irregularity IR2, the rear wheel W2R (or W2L) starts to pass through the above irregularity IR2. At a time point T18 after the delay time interval td has elasped from the time point T12, at which the suspension characteristic was altered to "SOFT" responding to the irregularity IR1, the suspension characteristic should be duly restored to "SPORT". This time, however, the suspension characteristic is retained in the "SOFT" state since the recount of the delay time interval td is started at the time point T17. Thus, at the time point T19, the influence of shocks to the rear wheel W2R (or W2L) upon the vehicle body, is reduced.

At a time point T20 after the delay time interval td has elapsed from the time point T17, at which the recount of td was started, the rear wheel W2R (or W2L) has also passed through the irregularity IR2 and runs on the flat part of the road surface RS. The outputs of the front vehicle sensors H1R and H1L are scarcely fluctuated between the time point T17 and the time point T20. Thus, at the time point T20, the ECU 4 starts to alter the suspension characteristic from "SOFT" to "SPORT". The alteration of the suspension characteristic is accomplished at a time point T21 after the time period Ta has elapsed from the time point T20. The current for driving the actuators A1R, A1L, A2R and A2L is supplied until a time point T22 after the time period Tb has elapsed from the time point T20.

In this embodiment, the right front vehicle height sensor H1R, the left front vehicle height sensor H1L, the ECU 4 and the process step 130 executed by the ECU 4 function as the front vehicle height detection means M1. The ECU 4 and the process step 200 executed by the ECU 4 function as the determination means M2. The right front air suspension S1R, the left front air suspension S1L, the right rear air suspension S2R, the left rear air suspension S2L, the suspension characteristic alteration actuators A1R, A1L, A2R and A2L, the ECU 4 and the process step 240 executed by the ECU 4 function as the suspension characteristic alteration means M3. The ECU 4 and the process steps 210, 220, 270, 280, 290 and 310 executed by the ECU 4 function as the restoration means M4.

As described above in detail, when the converted value h of the maximum vehicle height displacement, computed based on the vehicle height detected by the front vehicle height sensors H1R and H1L, is greater than or equal to the reference value hK (5 in this embodiment), the suspension characteristic is altered from "SPORT to "SOFT". The altered suspension characteristic is restored to "SPORT" after the delay time interval td has elapsed. If, however, the vehicle height displacement greater than the reference value hK is detected again before the delay time interval td has elapsed, the recount of the interval td is started from that time point. Thus, the unnecessary alteration of the suspension characteristic, e.g., that the suspension characteristic is again altered from "SOFT" to "SPORT" immediate after altered from "SPORT" to "SOFT", can be prevented. As a result, reliability and durability of the actuators A1R, A1L, A2R and A2L and the air suspensions S1R, S1L, S2R and S2L are remarkably improved.

When a dip or a bump in the road surface the size of which is out of a predetermined range is detected by the front vehicle height sensors H1R and H1L, the characteristics of all the front and rear air suspensions S1R, S1L, S2R and S2L are simultaneously altered from "SPORT" to "SOFT". Thus, a sporadic shock to the body, caused by riding-over a bump or riding-through a dip, can be more effectively absorbed so as to improve the riding comfort, compared with the suspension controllers which alter only those of the rear air suspensions to "SOFT". Since the time interval t for detecting the vehicle height displacement is set to the value equal to or shorter than the cycle time of the resonant vibration of unsprung mass, the irregularity of the road surface can be surely detected without delay.

The suspension characteristic is appropriately altered in response to road condition. When the irregularity of the road surface is detected by the front vehicle height sensors H1R and H1L, the suspension characteristics of all wheels are altered to "SOFT", while being restored to "SPORT" after the delay time interval has elapsed. Thus, in riding over a sporadic bump or through a dip, it makes it possible to improve the riding comfort, while in running on the flat road, it makes it possible to keep good control and high stability. Namely, both the characteristics contrary to each other can stand together. As a result, the freedom of the designing the suspension is expanded without a sacrifice of either characteristic adjustment.

In this embodiment, the suspension characteristic is altered between the "SOFT" state and the "SPORT" state. It is, however, possible to control the suspension characteristic between three or more stages including the "HARD" state. That is realized by combining a plurality of characteristics, such as the spring constants of the air suspensions S1R, S1L, S2R and S2L, damping force of the shock absorbers, bush stiffness or the stabilizer stiffness. In this case, the suspension characteristic can be controlled more effectively in response to road condition. For example, the suspension characteristic may be altered to "SOFT" in response to a sporadic dip or bump so as to absorb the shock to the body, and may be then altered to "HARD" so as to prevent the subsequent reactive vibration.

Examples of suspension characteristic alteration means apart from any air suspensions are described below.

Figure 13A:
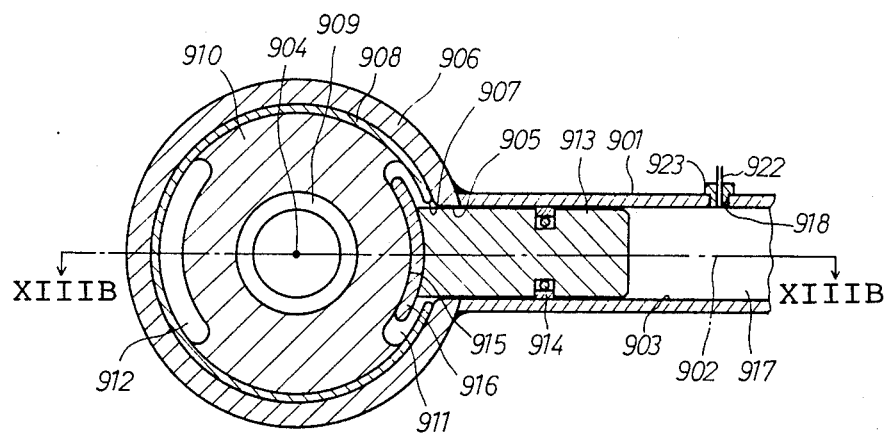
Figure 13B:
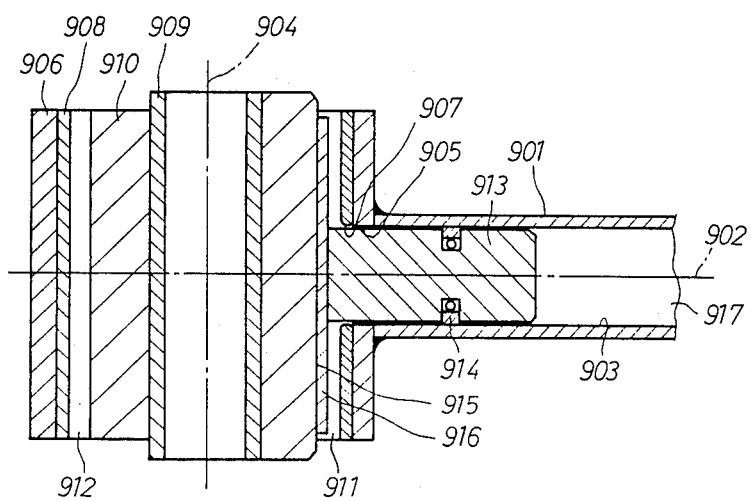
FIG. 13B is a sectional view taken on line XIIIB—XIIIB of FIG. 13A.

The first example is a bush for joining suspension bars such as the upper and lower control arms of a suspension, as shown in FIGS. 13A and 13B. The stiffness of the bush can be changed so as to alter the characteristic of the suspension. The spring constant and damping force of the bush are varied accompanied with changes of the bush stiffness.

FIG. 13A shows a sectional view of the joint of the suspension bar. FIG. 13B shows a sectional view taken on line XIIIB—XIIIB of FIG. 13A. In the drawings, numeral 901 designates a control arm extending along an axis 902 and having a hole 903. A sleeve 906, which extends along an axis 904 perpendicular to the axis 902 and which has a hole 905, is welded around the hole 905 at one end of the control arm 901. An outer cylinder 908 having a hole 907 is press-fitted in the sleeve 906. An inner cylinder 909 is provided in the outer cylinder 908 concentrically thereto. A bush 910 made of vibration-proof rubber is interposed between the outer cylinder 908 and the inner cylinder 909. The bush 910 and the outer cylinder 908 define arc-shaped openings 911 and 912 which are located to be opposed to each other along the axis 904, thus the stiffness in the direction of the axis 902 is set at a relatively low value. The hole 903 of the control arm 901 constitutes a cylinder which supports a piston 913 for movement back and forth along the axis 902. A sealing member 914 is tightly packed in-between the piston 913 and the inside surface of the hole 903. A contact plate 916 is secured at one end of the piston 913. The contact plate 916 curves about and extends along the axis 904, thus being brought into contact with the inside surface 915 of the opening 911.

The other end of the control arm 901 is constructed the same as shown in FIGS. 13A and 13B. A cylinder chamber 917 is defined between the piston 913 and another piston (not shown in the drawings) and is fitted with the other end of the control arm 901. The cylinder chamber 917 is connected with the exterior through a tapped hole 918 provided in the control arm 901. A nipple 923, fixed on one end 922 of a conduit connected to an oil pressure source (not shown in the drawings), is secured in the tapped hole 918 to apply oil pressure to the cylinder chamber 917.

When the oil pressure in the cylinder chamber 917 is relatively low, the force pushing the piston 913 leftward in the drawings is so weak that the piston is held in such a position (shown in the drawings) that the contact plate 916 is brought into light contact with the inner surface 915 of the bush 910. As a result, the stiffness of the bush 910 in the direction of the axis 902 is made relatively low. When the oil pressure in the cylinder chamber 917 is relatively high, the piston 913 is driven leftward in the drawings and the contact plate 916 pushes the inner surface 915 of the bush 910 so that the portion of the bush between the contact plate 916 and the inner cylinder 909 is compressed. As a result, the stiffness of the bush 910 in the direction of the axis 902 is raised.

If the suspension bar is provided between the body and the wheel of a vehicle, the characteristic of the suspension for the rear wheel can be altered by controlling the oil pressure in the cylinder chamber 917 through the action of an actuator such as a pressure control valve. When the oil pressure is raised by an instruction from the ECU 4, the stiffness of the bush 910 is enhanced to increase the damping force and spring constant of the suspension. Thus, the suspension characteristic is altered to 'HARD' state so as to improve the controllability and stability of the vehicle. When the oil pressure is lowered, the damping force for the rear part of the vehicle is reduced.

Figure 14A:
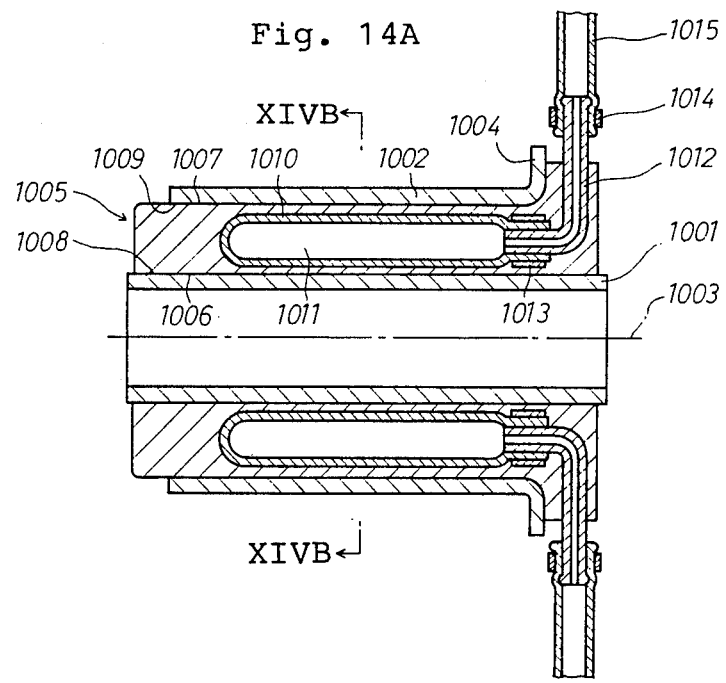
FIG. 14A is a sectional view of another rubber bush as a second example.
Figure 14B:
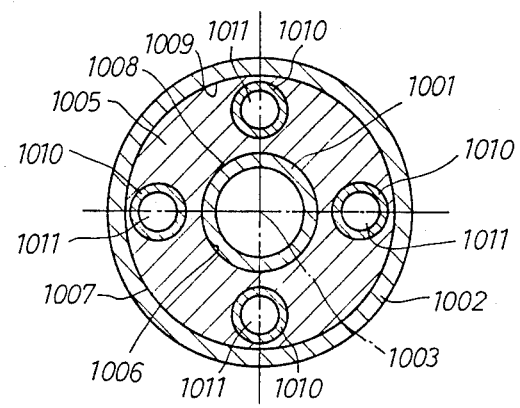
FIG. 14B is a sectional view taken on line XIVB—XIVB of FIG. 14A.

The second example is another bush which is shown in FIGS. 14A and 14B and which have the same function as the former.

FIG. 14A shows a sectional view of the bush integrally constructed with inner and outer cylinders as a bush assembly. FIG. 14B shows a sectional view taken on line XIVB—XIVB of FIG. 14A. In the drawings, four expansible and compressible hollow bags 1010, which extend along an axis 1003 and which are separately located in equiangular positions around the axis, are embedded in a bush 1005. The hollow bags 1010 define four chambers 1011 extending along the axis 1003 and being separately located at equiangular positions around the axis. Each hollow bag 1010 is secured at one end on one end of a coupler 1012, embedded in the bush 1005 by a clamp 1013, so as to connect the chambers 1011 with the exterior by means of the coupler 1012. One end of a hose 1015 is fixedly connected to the other end of the coupler 1012 by a clamp 1014, and the other end of the hose 1015 is connected to a compressed air source by means of an actuator such as a pressure control valve (not shown in the drawings). The controlled air pressure can be introduced into each chamber 1011. When the actuator is put in operation by the ECU 4, the air pressure in each chamber 1011 can be varied to change the stiffness of the bush in a stepless manner. The stiffness of the bush can thus be appropriately altered to be high (HARD) or low (SOFT) after a shock at the front wheels is detected.

FIGS. 15A–15G show a construction of a stabilizer as the third example.

Figure 15A:
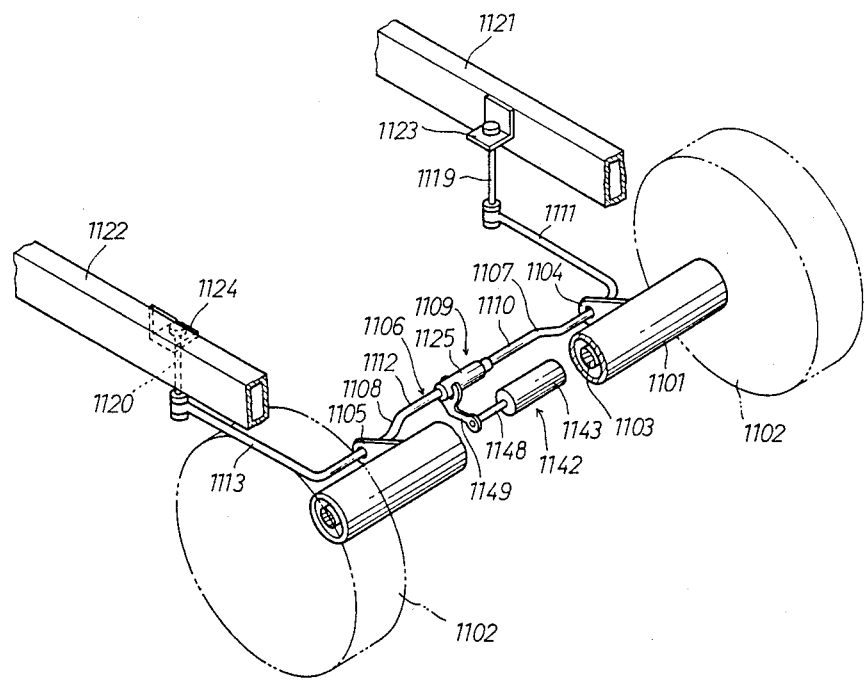
FIG. 15A is a perspective view of a stabilizer as a third example in use.
Figure 15B:
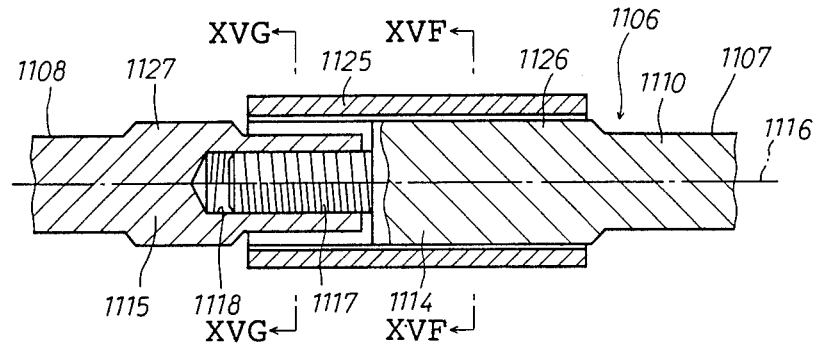
FIGS. 15B and 15C are enlarged sectional views each showing a part of the third example of FIG. 15A.
Figure 15C:
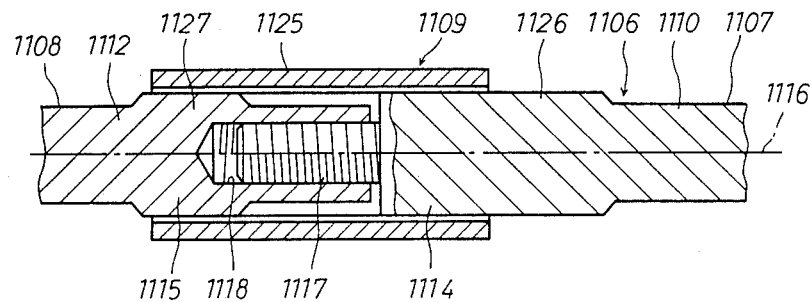
Figure 15D:
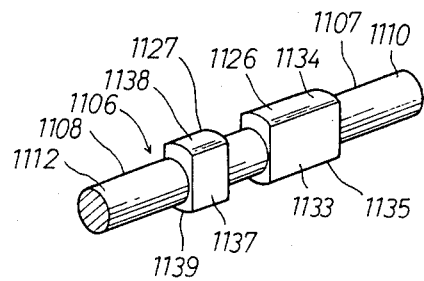
FIG. 15D is a perspective view of the main part of the third example of FIG. 15A.
Figure 15E:
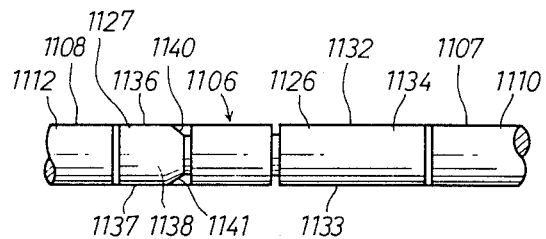
FIG. 15E is a plan view of FIG. 15D.
Figure 15F:
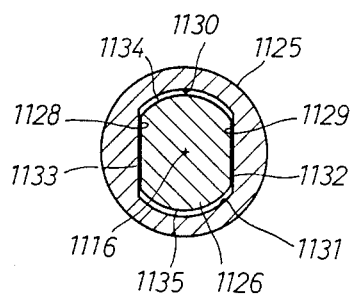
FIG. 15F is a sectional view taken on line XVF—XVF of FIG. 15B.
Figure 15G:
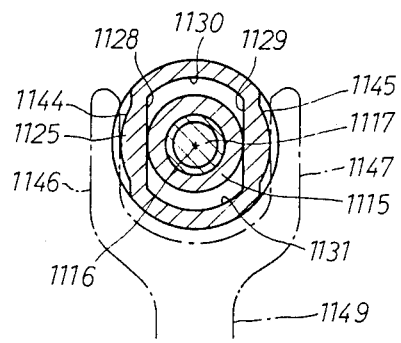
FIG. 15G is a sectional view taken on line XVG—XVG of FIG. 15B.

FIG. 15A shows an exploded perspective view of a torsion-bar-type stabilizer built in an axle-type suspension of an automobile. FIGS. 15B and 15C respectively show enlarged partial sectional views of the main part of the stabilizer of FIG. 15A in the coupled and uncoupled states. FIG. 15D shows a perspective view of the main part shown in FIGS. 15B and 15C, omitting the clutch. FIG. 15E shows a plan view of the main part shown in FIG. 15D. FIG. 15F shows a cross-sectional view taken on line XVF—XVF of FIG. 15B. FIG. 15G shows a cross-sectional view taken on line XVG—XVG of FIG. 15B.

In the drawings, an axle 1103 coupled with wheels 1102 is rotatably supported by an axle housing 1101. A pair of brackets 1104 and 1105 is secured on the axle housing 1101 in positions separated from each other in the direction of the width of the body. A torsion-bar-type stabilizer 1106 is coupled to the axle housing 1101 by means of bushes (not shown in the drawings) by the brackets 1104 and 1105.

The stabilizer 1106 includes a right portion 1107 and a left portion 1108 which can be selectively coupled to each other by a coupling unit 1109. A protrusion 1117 and a hole 1118, which extend along an axis 1116, are respectively formed at the ends 1114 and 1115 of rods 1110 and 1112 opposite the arms 1111 and 1113, as shown in FIG. 15B. The protrusion 1117 and the hole 1118 are respectively constructed as a male screw and a female screw which are engaged with each other so as to couple the rods 1110 and 1112 rotatably relative to each other around the axis 1116. The tips of the arms 1111 and 1113 are coupled to brackets 1123 and 1124, secured on side frames 1121 and 1122 of the vehicle by links 1119 and 1120. As shown in FIG. 15C, the coupling unit 1109 includes a cylindrical clutch 1125, a clutch guide 1126 and a clutch bearer 1127. The clutch guide 1126 is provided at one end 1114 of the rod 1110 and supports the clutch 1125 non-rotatably around the axis 1116 but permitting movement back and fourth along the axis. The clutch bearer 1127 is provided at the end 1115 of the rod 1112 and bears the clutch 1125 non-rotatably around the axis 1116. The inside circumferential surface of the clutch 1125 includes planes 1128 and 1129 facing each other relative to the axis 1116 and extending in parallel with each other along the axis, and partially cylindrical surfaces 1130 and 1131 adjoining the planes in position opposed to each other relative to the axis 1116, as shown in FIG. 15F. Corresponding to the inside circumferential surface of the clutch 1125, the peripheral surface of the clutch guide 1126 includes planes 1132 and 1133 facing each other relative to the axis 1116 and extending in parallel with each other along the axis, and partially cylindrical surfaces 1134 and 1135 adjoining the planes in positions opposed to each other relative to the axis 1116. The peripheral surface of the clutch bearer 1127 includes planes 1136 and 1137 facing each other relative to the axis 1116 and extending in parallel with each other along the axis, and partially cylindrical surfaces 1138 and 1139 adjoining the planes in positions opposed to each other relative to the axis 1116, as shown in FIG. 15D or FIG. 15E.

The planes 1132 and 1133 of the clutch guide 1126 are always engaged with those 1128 and 1129 of the clutch 1125 as shown in FIG. 15F. When the clutch 1125 is in a position shown in FIG. 15C, planes 1136 and 1137 of the clutch bearer 1127 are also engaged with those 1128 and 1129 so that the right portion 1107 and the left portion 1108 of the stabilizer are integrally coupled to each other so as not to rotate along the axis 1116. As shown in FIG. 15E, the ends 1140 and 1141 of the planes 1136 and 1137 of the clutch bearer 1127 at the right portion 1107 of the stabilizer are chamfered. Even if the rods 1110 and 1112 are slightly rotated to each other around the axis 1116, the clutch 1125 can be moved from a position shown in FIG. 15B to a position shown in FIG. 15C. The right portion 1107 of the stabilizer is thus integrally coupled to the left portion 1108 thereof as the arms 1111 and 1113 of the portions are on the same plane.

The clutch 1125 is moved back and fourth along the axis 1116 by an actuator 1142 controlled by the ECU 4. The actuator 1142 shown in FIG. 15A includes a hydraulic piston-cylinder unit 1143 secured on a differential casing (not shown in the drawing), and a shifting fork 1149. The fork 1149 has arms 1146 and 1147 engaged in grooves 1144 and 1145 of the peripheral surface of the clutch 1125, as shown in FIG. 15G, and is coupled to the piston rod 1148 of the piston-cylinder unit 1143 shown in FIG. 15A.

When the clutch 1125 is placed in a position shown in FIG. 15C by the actuator 1142 according to an instruction from the ECU 4, the right portion 1107 and left portion 1108 of the stabilizer 1106 are integrally coupled to each other to reduce the rolling of the vehicle, thus improving its controllability and stability. On the other hand, when the clutch 1125 is placed in a position shown in FIG. 15B by the actuator 1142, the right portion 1107 and left portion 1108 of the stabilizer 1106 can be rotated relative to each other around the axis 1116 to reduce the shock to the vehicle, and more particularly to reduce the shock to the wheels of only one side of the vehicle, thus improving the riding comfort of the vehicle.

Figure 16A:
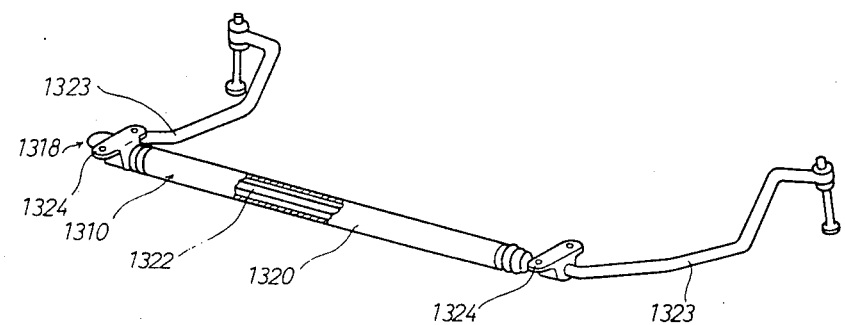
FIG. 16A is a perspective view of another stabilizer as a fourth example.
Figure 16B:
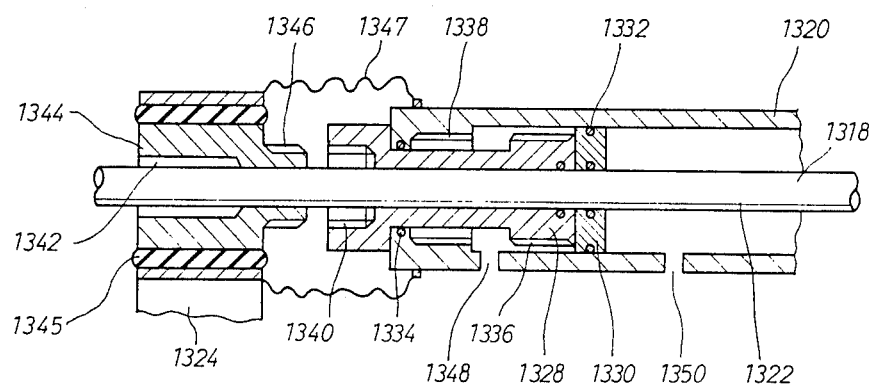
FIG. 16B is an enlarged sectional view showing a part of the fourth example of FIG. 16A.

FIGS. 16A and 16B show another stabilizer as the fourth example.

A stabilizer-bar-type assembly 1310 includes a first stabilzer bar 1318 and a second stabilizer bar 1320, as shown in FIG. 16A. The first stabilizer bar 1318 includes a main portion 1322 and an arm 1323. The main portion 1322 is attached to the body of a vehicle by a pair of fitting metals 1324 so that the main portion 1322 can be twisted around its axis.

The second stabilizer bar 1320 is hollow so that the main portion 1322 of the first stabilizer bar 1318 extends through the second stabilizer bar, as shown in FIG. 16B. The second stabilizer bar 1320 is disposed inside the pair of fitting metals 1324 so that the first stabilizer bar 1318 can be connected to and disconnected from the second stabilizer. A piston 1330, on which a spool 1328 is secured, is slidably fixed inside one end of the second stabilizer bar 1320 in such a manner that the piston is liquid-tightly sealed by a sealing member 1332. The spool 1328 is liquid-tightly sealed by a sealing member 1334, and projects out of the second stabilizer bar 1320. The spool 1328 has splines 1336 near the pistons 1330, while the second stabilzer bar 1320 has, at one end, splines 1338 which can be engaged with the splines 1336. The spool 1328 has other splines 1340 inside the outwardly projecting end thereof.

A coupler 1344 is connected to the main portion 1322 of the first stabilizer bar 1318 by splines 1342. The coupler 1344 has splines 1346 engageable with the splines 1340, which extend from the spool 1328 and which are opposed thereto. The coupler 1344 is connected to the fitting metals 1324 by means of a rubber bush 1345, as shown in FIG. 16B, so that the main portion 1322 of the first stabilizer bar 1318 is twisted by deforming the bush 1345. The coupler 1344 is fitted in such a position that the splines 1340 are engaged with the splines 1346 when the spool 1328 is moved leftward in the drawing, and the splines 1336 are engaged with the splines 1338. A bellowslike boot 1347 for protecting the splines 1340 and 1346 from dust is provided between the coupler 1344 and the second stabilizer bar 1320.

Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 via an actuator such as a pressure control valve, the piston 1330 is moved leftward in the drawing, together with the spool 1328. The splines 1336 are engaged with the splines 1338, and the splines 1340 with the splines 1346. As a result, the first and second stabilizer bars 1318 and 1320 are coupled to each other so as to raise the stiffness of the stabilizer bar assembly. On the contrary, when the pressure fluid is led to the other port 1348, the piston 1330 is moved rightward in the drawing, thus the splines are disengaged from each other. As a result, the stiffness of the stabilizer bar assembly is reduced.

Figure 17A:
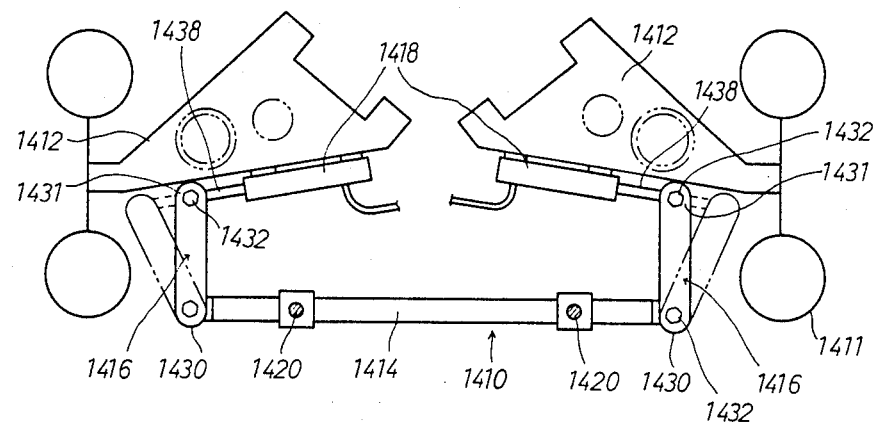
FIG. 17A is a schematic plan view of another stabilizer as a fifth example.
Figure 17B:
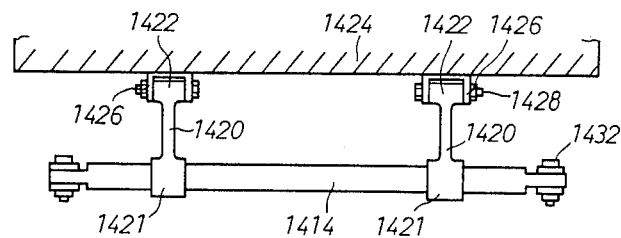
FIG. 17B is an explanatory view showing a part of FIG. 17A.
Figure 17C:
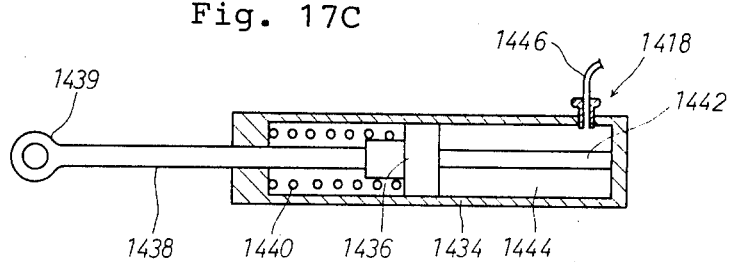
FIG. 17C is a sectional view of the extending part of FIG. 17A.

FIGS. 17A, 17B and 17C show three different views of still another stabilizer as the fifth example.

FIG. 17A shows a schematic plan view of a stabilizer 1410. In the drawing, numeral 1411 denotes wheels and numeral 1412 denotes suspension arms. The stabilizer 1410 includes a main part 1414, a pair of arms 1416 and extending parts 1418. The main part 1414 in the form of a round bar is laid through bearing portions 1421 of a pair of links 1420 disposed at certain distances apart from each other in the direction of the width of the body 1424 of a vehicle, and is supported by the bearing portions 1421 so that the main part 1414 can be twisted around its axis. The other bearing portions 1422 at the upper ends of the links 1420 are rotatably supported by pins 1428 extending through brackets 1426 welded on the vehicle body 1424. As a result, the main part 1414 is disposed along the width of the vehicle body, and can be twisted relative to the vehicle body.

The pair of arms 1416 are made of flat bars. The first ends 1430 of the arms 1416 are coupled to both ends of the main part 1414 by bolts and nuts 1432 so that the arms can be rotated around vertical axes. The second ends 1431 of the arms 1416 are located at certain distances away from the first ends 1430 to the front-to-rear direction of the vehicle body 1424. The arms 1416 may be oblique to the front to rear direction of the vehicle.

The second ends 1431 of the arms 1416 are displaced in the direction of the width of the vehicle body 1424 by the extending parts 1418 which may be power cylinders. Each of the power cylinders shown in FIG. 17C includes a cylinder 1434, a piston 1436 liquid-tightly and slidably fitted in the cylinder 1434, a piston rod 1438, which is coupled at one end to the piston 1436 and which projects at the other end out of the cylinder 1434, and a compressed spring 1440 for displacing the piston 1436 in such a direction as to contract the piston rod 1438. A stopper 1442 secured on the piston 1436 prevents the piston from being displaced more than a predetermined distance.

The cylinder 1434 is secured on the suspension arm 1412 in such a manner that the piston rod 1438 is located outside the cylinder 1434 in the direction of the width of the vehicle body. The second end 1431 of the arm 1416 is coupled to the outwardly projecting end 1439 of the piston rod 1438 by the bolts and nuts 1432 so that the arm 1416 can be rotated around the vertical axis.

One end of a flexible hose 1446 is connected to a liquid chamber 1444 of the cylinder 1434 opposite the side on which the compressed spring 1440 is located. The other end of the flexible hose 1446 is connected to a pressure source (not shown in the drawings) through an actuator such as a pressure control valve. Unless pressure is applied to the liquid chambers 1444 of the power cylinders according to the state of the actuator instructed by the ECU 4, the second ends 1431 of the arms 1416 are located in relatively inner positions as shown in FIG. 17A, so that the anti-roll rate of the stabilizer is low.

On the contrary, when the actuator is operated by the ECU 4 to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as indicated by imaginary lines, i.e., double dotted chain lines, in FIG. 17A, to increase the arm ratio of the stabilizer to raise its stiffness against the rolling of the vehicle.

Figure 18A:
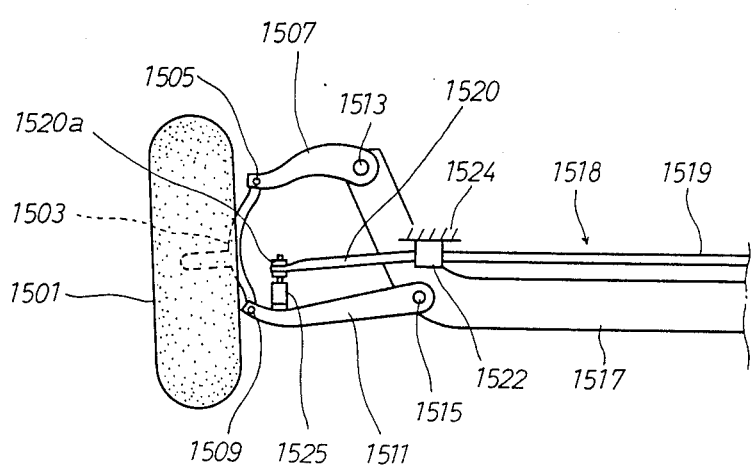
FIG. 18A is a front view showing a part of a stabilizer and a joint as a sixth example in use.
Figure 18B:
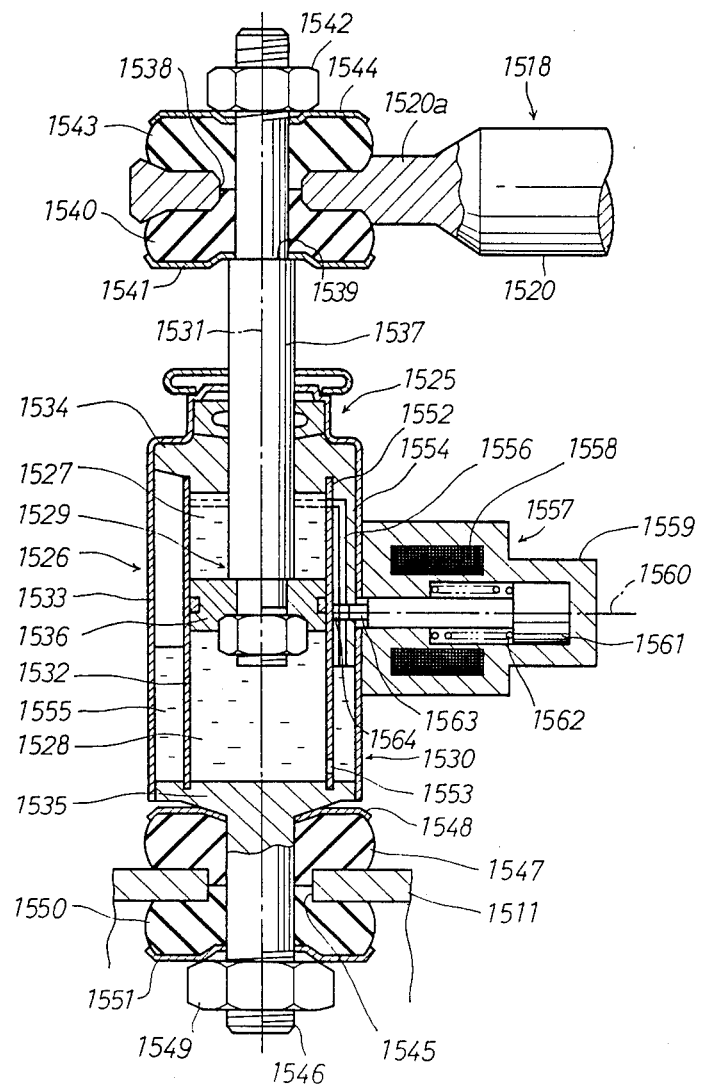

FIGS. 18A and 18B show a construction of a coupling unit for a stabilizer and a lower control arm, as the sixth example.

FIG. 18A shows a partial front view of a wishbone-type suspension including a coupling unit for a stabilizer of a vehicle. FIG. 18B shows an enlarged sectional view of the coupling unit shown in FIG. 18A. In the drawings, a wheel 1501 is rotatably supported by a knuckle 1503. The knuckle 1503 is pivotally coupled at the upper end to one end of an upper control arm 1507 by means of a pivot 1505, and is pivotally coupled at the lower end to one end of a lower control arm 1511 by means of a pivot 1509. The upper control arm 1507 and the lower control arm 1511 are pivotally coupled to a cross member 1517 of the vehicle by pivots 1513 and 1515. A stabilizer 1518, which is shaped as a U, is disposed along the width of the vehicle as shown in FIG. 18A. The stabilizer 1518 is coupled at its central rod 1519 to the body 1524 of the vehicle by brackets 1522 by means of rubber bushes (not shown in the drawing), so that the stabilizer can be rotated around its axis. The tip 1520a of an arm 1520 of the stabilizer 1518 is coupled to one portion near one end of the lower control arm 1511 by a coupling unit 1525. FIG. 18B shows the coupling unit 1525 including a piston-cylinder assembly 1526. The piston-cylinder assembly 1526 includes a piston 1529 and a cylinder 1530 which cooperate with each other to define two cylinder chambers 1527 and 1528. The cylinder 1530 includes an inner cylinder 1532 which supports the piston 1529 for movement back and forth along an axis 1531, an outer cylinder 1533 disposed concentrically to the inner cylinder 1532, and end caps 1534 and 1535 which close both the ends of the inner cylinder and the outer cylinder. The piston 1529 includes a main portion 1536 and a piston rod 1537, which bears the main portion 1536 at one end thereof and which extends along the axis 1531 through the end cap 1534 and the hole 1538 of the tip 1520a of the arm 1520 of the stabilizer 1518.

A rubber bush 1540 and a retainer 1541 for holding the bush are interposed between a shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is disposed with through holes 1552 and 1553 near the end caps 1534 and 1535. The end cap 1534 is integrally provided with a projection 1554 which extends along the axis 1531 between the inner cylinder 1532 and the outer cylinder 1533 and is located in tight contact with the inner and outer cylinders. The projection 1554 has an internal passage 1556 which is coincident at one end with the through hole 1552 and is open at the other end into an annular space 1555 between the inner cylinder 1532 and the outer cylinder 1533. As a result, the through hole 1552, the internal passage 1556, the annular space 1555 and the other through hole 1553 define a passage means for connecting both the cylinder chambers 1527 and 1528 to each other. A part of the annular space 1555 is filled with air. The cylinder chambers 1527 and 1528, the internal passage 1556 and the remaining part of the annular space 1555 are filled with oil. The change in the volume of the piston rod 1537 in the cylinder 1530, which is caused by the displacement of the piston 1529 from the cylinder 1530, is compensated by compression or expansion of the air filled in the part of the annular space 1555.

The connection of the internal passage 1556 is selectively controlled by a normally-opened solenoid valve 1557. The solenoid valve 1557 includes a core 1561, a compressed helical spring 1562 and a housing 1559 with a solenoid 1558. The housing 1559 is secured at one end on the outer cylinder 1533. The core 1561 is supported in the housing 1559 for movement back and forth along an axis 1560. The compressed helical spring 1562 presses the core 1561 rightward in FIG. 18B. A valve element 1563 is integrally formed as one piece at one end of the core 1561 to be selectively fitted into a hole 1564 extending to penetrate the internal passage 1556 of the projection 1554 in the horizontal direction.

When no electricity is applied to the solenoid 1558 according to an instruction from the ECU 4, the core 1561 is pressed rightward in the drawing by the compressed helical spring 1562 so as to open the valve 1557 to connect the internal passage 1556. On the contrary, when electricity is applied to the solenoid 1558 according to an instruction from the ECU 4, the core 1561 is driven leftward in the drawing against the force of the compressed helical spring 1562 so as to fit the valve element 1563 into the hole 1564 to isolate the internal passage 1556.

In the coupling unit constructed as above, when electricity is applied to the solenoid 1558 of the solenoid valve 1557, the solenoid valve 1557 is closed so as to disconnect the cylinder chambers 1527 and 1528 from each other. Thus, oil in one cylinder chamber is kept from flowing to the other cylinder chamber, so that the piston 1529 is hindered from moving relative to the cylinder 1530 along the axis 1531. As a result, the stabilizer 1518 works for suppressing the rolling of the vehicle so as to keep good control and high stability of the vehicle even when one of the wheels rides over a bump or through a dip in a road surface.

On the other hand, when no electricity is applied to the solenoid 1558, the solenoid valve 1557 is maintained in an open position shown in FIG. 18B, so that oil in both the cylinder chambers 1527 and 1528 can freely flow to each other via the internal passage 1556 and so forth. As a result, the piston 1529 can be smoothly moved in the cylinder 1530 so that the tips of both the right and left arms 1520 can be smoothly moved around the corresponding lower control arms 1511. Since the stabilizer does not work this time, the damping force for rear wheels of the vehicle is reduced to keep good riding comfort.

Although the invention has been described with reference to specific embodiments thereof, it will be apparent that numerous changes and modifications may be made therein without departing from the scope of the invention. It is, therefore, to be understood that it is not intended to limit the invention to the embodiment shown but only by the scope of the claims which follow.

What is claimed is:

1. A suspension controller for a vehicle comprising:

front vehicle height detection means for detecting a vehicle height at a front wheel and for generating a vehicle height signal;

determination means for deriving vehicle height data from the vehicle height signal, for determining if a difference between a maximum and minimum of the vehicle height data during a predetermined period is greater than a reference value, the predetermined period being shorter than a cycle time of a resonant vibration of an unsprung mass of the vehicle, and for generating a determination signal when the difference is greater than the reference value; and suspension characteristic alteration means responsive to the determination signal for alternating a suspension characteristic at the rear wheel of the vehicle before the rear wheel reaches a position at which the difference has been determined to be greater than the reference value.

2. The suspension controller for a vehicle according to claim 1, wherein the predetermined delay time interval is greater than or equal to a time period which is calculated by dividing a wheel base of the vehicle by the current vehicle speed.

3. The suspension controller for a vehicle according to claim 2, wherein the predetermined delay time interval is greater than or equal to the time period calculated by dividing a wheel base of the vehicle by the current vehicle speed, and is less than or equal to three times thereof.

4. The suspension controller for a vehicle according to claim 3, wherein the vehicle height data derived from the vehicle height signal by said determination means is a displacement from a standard value of the vehicle height signal.

5. The suspension controller for a vehicle according to claim 3, wherein the vehicle height data derived from the vehicle height signal by said determination means is a speed of the change in the vehicle height signal.

6. The suspension controller for a vehicle according to claim 3, wherein the vehicle height data derived from the vehicle height signal by said determination means is an acceleration of the change in the vehicle height signal.

7. The suspension controller for a vehicle according to claim 3, wherein the vehicle height data derived from the vehicle height signal by said determination means is an amplitude of the vibration of the vehicle height signal.

8. The suspension controller for a vehicle according to claim 4, wherein said suspension characteristic alteration means alters the suspension characteristic by varying the spring constant of an air suspension.

9. The suspension controller for a vehicle according to claim 4, wherein said suspension characteristic alteration means alters the suspension characteristic by varying damping force of a shock absorber.

10. The suspension controller for a vehicle according to claim 4, wherein said suspension characteristic alteration means alters the suspension characteristic by varying compliance of a bush of the suspension.

11. The suspension controller for a vehicle according to claim 4, wherein
said suspension characteristic alteration means alters the suspension characteristic by varying torsional stiffness of a stabilizer.

12. A suspension controller for a vehicle according to claim 1, further comprising restoration means for restoring the altered suspension characteristic when a predetermined delay time interval has elapsed from a time point at which the vehicle height data was determined to be out of the predetermined range by said determination means, and for starting the recount of said predetermined delay time interval if the vehicle height data is again determined to be out of the predetermined range by said determination means before the predetermined delay time interval elapses from the first determination.

* * * * *